US008687940B2

(12) United States Patent  
Park et al.

(10) Patent No.: US 8,687,940 B2  
(45) Date of Patent: Apr. 1, 2014

(54) METHOD AND A DIGITAL BROADCAST RECEIVER FOR PROVIDING A LIST OF RECORDS

(75) Inventors: Cheon Hyeon Park, Seoul (KR); Suk Won Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1132 days.

(21) Appl. No.: 12/382,563

(22) Filed: Mar. 18, 2009

(65) Prior Publication Data

US 2009/0257738 A1 Oct. 15, 2009

(30) Foreign Application Priority Data

Mar. 19, 2008 (KR) .................. 10-2008-0025339

(51) Int. Cl.  
*H04N 7/26* (2006.01)

(52) U.S. Cl.  
USPC ........... 386/239; 386/211; 386/216; 386/217; 386/220; 386/241

(58) Field of Classification Search  
USPC .................. 386/211, 216, 217, 220, 241, 243  
See application file for complete search history.

(56) References Cited

U.S. PATENT DOCUMENTS

| 2003/0198461 | A1* | 10/2003 | Taylor et al. ..................... 386/83 |
| 2006/0215993 | A1* | 9/2006 | Yamada .......................... 386/83 |
| 2007/0180057 | A1* | 8/2007 | McEnroe ....................... 709/218 |
| 2007/0220554 | A1* | 9/2007 | Barton et al. ................... 725/46 |
| 2008/0124055 | A1* | 5/2008 | Shahraray et al. ............ 386/124 |
| 2011/0170840 | A1* | 7/2011 | Ellis et al. ..................... 386/241 |

OTHER PUBLICATIONS

Cable Television Labatories, OpenCable™ Application Platform Specification OCAP Digital Video Recorder (DVR) OC-SP-OCAP-DVR-I02-050524, May 24, 2005, Cable Television Laboratories Inc., I02-050524.*

* cited by examiner

*Primary Examiner* — Carl Colin  
*Assistant Examiner* — Gary Lavelle  
(74) *Attorney, Agent, or Firm* — McKenna Long & Aldridge LLP

(57) ABSTRACT

A method for providing a list of records in a digital broadcast receiver and a digital broadcast receiver for providing a list of records are disclosed. A reception unit receives a broadcast signal including a data broadcast-associated application. A storage medium store records. And A controller manages the application, receives a list request for requesting a list of record series belonging to a series from the application, generates a list, selects a record from a list of the stored records based on a link between the series and the record, includes the selected record in the generated list, and transmits the generated list to the application.

8 Claims, 13 Drawing Sheets

FIG. 7

*700 org.ocap.shared.drv.navigation
Class SeriesRecordingFilter java.lang.object
 └ org.ocap.shared.dvr.navigation.RecordingListFilter
    └ org.ocap.shared.drv.navigation.SeriesRecordingFilter public class SeriesRecordingFilter —— 710
extends RecordingListFilter —— 720

Filter to filter based on parent recording request.

| Constructor Summary |
|---|
| SeriesRecordingFilter(RecordingRequest recordingRequest) —— 730<br>  Constructs the filter based on a particular parent RecordingRequest. |

| Method Summary | |
|---|---|
| boolean | accept (RecordingRequest entry) —— 740<br>  Tests if the given RecordingRequest passes the filter. |
| RecordingRequest | getFilterValue ( ) —— 750<br>  Reports the value of AppID used to create this filter. |

| Methods inherited from class org.ocap.shared.dvr.navigation.RecordingListFilter |
|---|
| getCascadingFilter, setCascadingFilter |

METHOD AND A DIGITAL BROADCAST RECEIVER FOR PROVIDING A LIST OF RECORDS

This application claims the benefit of Korean Patent Application No. 10-2008-0025339, filed on Mar. 19, 2008, which is hereby incorporated by reference as if fully set forth herein.

BACKGROUND OF THE INVENTION

1. Field of the Invention

The present invention relates to a method for providing a list of records in a digital broadcast receiver and a digital broadcast receiver for providing a list of records, and more particularly, to a digital broadcast receiver for providing a list of specific records among records stored in a storage medium to an application and a method thereof.

2. Discussion of the Related Art

A broadcast wave transmitted from a broadcasting station includes various contents such as video, audio and application programs. The data broadcast standard for receiving such a broadcast wave and executing the application programs synchronized with video and audio has been developed and managed. Such a data broadcast standard can implement a variety of supplementary functions as well as a function for providing video and audio, when transmitted application programs are received and are loaded to a terminal and the loaded application programs are executed.

For example, a set-top-box is a terminal for supporting such a data broadcast standard. In the set-top-box, Java-based data broadcast middleware for porting a Java virtual machine on a device driver and supporting an application programming interface (API) using the Java virtual machine is implemented. Multiple system operators (MSOs) can easily manufacture application programs for servicing digital video recorders (DVRs), electronic program guides (EPGs) or the like using the Java API provided by the data broadcast middleware implemented in the set-top-box. When the application programs manufactured by the MSOs are transmitted via broadcast streams, the application programs are executed on the data broadcast middleware of the set-top-box.

Among the data broadcast standards, a "Globally Executable Multimedia Home Platform (GEM)" includes only most common contents, and an "OpenCable Application Platform (OCAP)" is the standard obtained by extending the GEM to a cable broadcast environment and is mainly used in North America. These two standards have extended standards for respectively supporting DVRs, such as "DVB Digital Recording Extension to GEM" and "OCAP Extension: OCAP Digital Video Recorder".

The DVR is a function to record current broadcast contents and allowing the broadcast contents to be watched later or a function to perform functions such as rewind, pause and so on with respect to a real-time broadcast. In order to use the DVR function, the middleware of the set-top-box should support a DVR-extended API of each standard. The MSOs should provide an application using the DVR API.

SUMMARY OF THE INVENTION

Accordingly, the present invention is directed to a method for providing a list of records in a digital broadcast receiver, and a digital broadcast receiver for providing a list of records that substantially obviate one or more problems due to limitations and disadvantages of the related art.

An object of the present invention is to provide a method for providing a list of records in a digital broadcast receiver, and a digital broadcast receiver for providing a list of records, which are capable of supporting the easy manufacture of an application for providing a list of records satisfying a specific condition among stored records.

Another object of the present invention is to provide a method for providing a list of records in a digital broadcast receiver, and a digital broadcast receiver for providing a list of records, which are capable of supporting the easy manufacture of an application for providing a list of record series among stored records.

Another object of the present invention is to provide a method for providing a list of records in a digital broadcast receiver, and a digital broadcast receiver for providing a list of records, which are capable of rapidly and easily detecting a list of records satisfying a specific condition among stored records according to the OCAP standard.

Another object of the present invention is to provide a method for providing a list of records in a digital broadcast receiver, and a digital broadcast receiver for providing a list of records, which are capable of rapidly and easily detecting a list of record series among stored records according to the OCAP standard.

Another object of the present invention is to provide a computer-readable recording medium having recorded thereon a program for executing a method for providing a list of records on a computer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing a list of records in a digital broadcast receiver, the method includes receiving a list request for requesting a list of record series belonging to a series from a data broadcast-associated application, generating a list for including the record series, selecting a record from records included in a list of stored records based on a link between the series and the record and including the selected record in the generated list, and transmitting the generated list to the data broadcast-associated application.

In addition, the link may be a link between an object for managing the series and an object for managing the record. Herein, the object for managing the series may be a ParentRecordingRequest object. Also, the object for managing the record may be a RecordingRequest object. Also, the link may be an inheritance relationship between the object for managing the series and the object for managing the record.

In addition, the link may be a link between an attribute value of the series and an attribute value of the record. Herein, the attribute value may include at least one of information for identifying a record and guide information of a record. Also the attribute value may include at least one of title information, kind information, genre information, producer information, actor information, and reproduction time information of a record.

In addition, the list of stored records may be a RecordingList including a RecordingRequest object.

In addition, the list of stored records may be a list of programs which are stored by the digital broadcast receiver.

In addition, the series may be a set of programs which are broadcasted in series.

In another aspect of the present invention, there is provided a digital broadcast receiver for providing a list of records, the digital broadcast receiver includes a reception unit configured to receive a broadcast signal including a data broadcast-associated application, a storage medium configured to store records, and a controller configured to manage the application, receive a list request for requesting a list of record series belonging to a series from the application, generate a list, select a record from a list of the stored records based on a link between the series and the record, include the selected record in the generated list, and transmit the generated list to the application.

In addition, the link may be a link between an object for managing the series and an object for managing the record. Herein the object for managing the series may be a ParentRecordingRequest object. Also, the object for managing the record may be a RecordingRequest object. Also, the link may be an inheritance relationship between the object for managing the series and the object for managing the record.

In addition, the link may be a link between an attribute value of the series and an attribute value of the record. Herein, the attribute value may include at least one of information for identifying a record and guide information of a record. Also, the attribute value may include at least one of title information, kind information, genre information, producer information, actor information, and reproduction time information of a record.

In addition, the list of the stored records may be a RecordingList including a RecordingRequest object.

According to a method for providing a list of records in a digital broadcast receiver, and a digital broadcast receiver for providing a list of records according to the present invention, since the list of records satisfying a specific condition among the list of stored records is provided via the interface module, multiple system operators (MSOs) can easily and simply manufacture an application capable of displaying the list of records satisfying the specific condition, such as a record series, among the list of records stored in a broadcast receiver, and a user can easily search and classify the records stored in the broadcast receiver via the application and conveniently search for a desired record. In particular, even when the user does not know the individual names of the records which are recorded as the record series, the user can rapidly and easily search for the list of records which are recorded as the series, by one command.

In addition, since a SeriesRecordingFilter class which inherits a RecordingListFilter class is added according to the OCAP standard without correcting the existing OCAP standard such that the provision of the list of records belonging to a specific record series among the list of stored records, it is possible to easily increase the completion degree of the OCAP standard.

In addition, since the records are filtered based on the link between the objects of the list of stored records or the link between the attributes of the stored records, a separate storage space does not need to be allocated and filtering can be performed by a simple comparison operation. Thus, it is possible to rapidly detect and provide the list of records satisfying the specific condition among the stored records.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a view showing an example of details of an application programming interface (API) of an interface module;

DETAILED DESCRIPTION OF THE INVENTION

Figure 1:
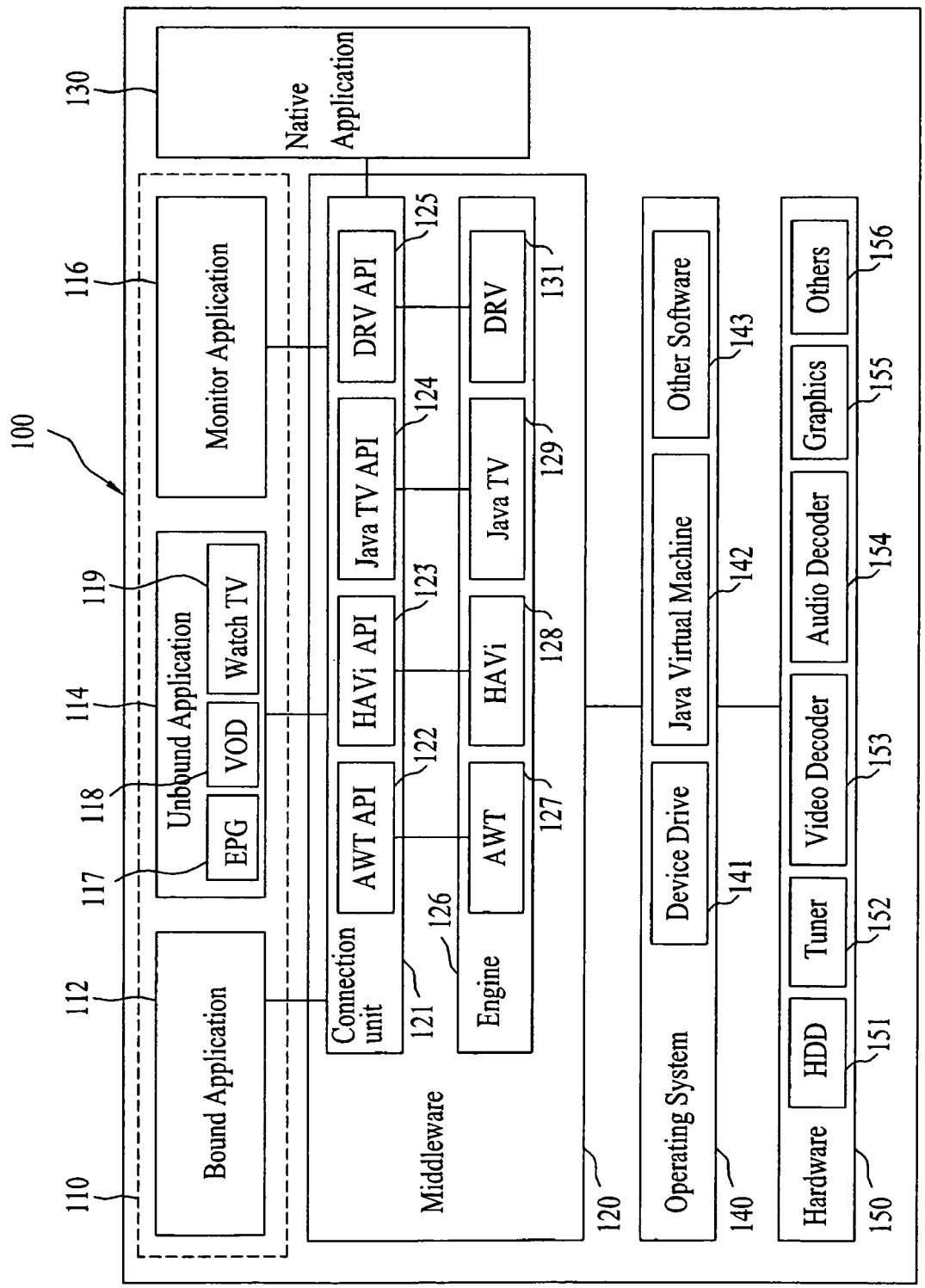
FIG. 1 is a structural diagram showing the configuration of a layer structure of a broadcast receiver according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the exemplary embodiments of the present invention will be described with reference to the accompanying drawings. The configuration and action of the present invention shown in the drawings and described with reference to the drawings will be described as at least one embodiment; however, the technical idea and the core configuration and action of the present invention are not limited thereto.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is a structural diagram showing the configuration of a layer structure of a broadcast receiver according to an exemplary embodiment of the present invention.

Referring to FIG. 1, the broadcast receiver 100 includes applications 110 and 130, a middleware 120, an operating system 140 and a hardware 150.

The middleware 120 plays a role for mediating data between the applications 110 and 130 and the operating system 140. In addition, the middleware 120 performs a function for receiving requests of the applications 110 and 130, executing the received requests, calculating results for the received requests, and transmitting the calculated results to the applications 110 and 130. The middleware 120 includes a connection unit 121 and an engine 126.

The connection unit 121 performs an interface function for transmitting or receiving data, information and a command between the engine 126 and the application 110. That is, the application 110 may use a service provided by the middleware 120 via the connection unit 121. A request mode for requesting a specific service provided by the middleware 120 is defined in each broadcast standard such that a manufacturer of the application 110 can use the middleware 120. If the application 110 requests the middleware 120 to perform a specific service according to a request mode defined in each broadcast standard, the connection unit 121 receives the request for performing of the specific service and delivers the request for the performing of the specific service to the engine 126 such that the engine 126 performs the requested specific service.

An example of the request mode for requesting a specific service provided by the middleware 120 defined in the broadcast standard may include an application programming interface (API) defined by JAVA, and the kinds of the API include a AWT API, a HAVi API, a JavaTV API, a DVR API, and a DVR API. An application manufacturer may develop the application 110 based on the API defined in the broadcast standard.

If the request mode for requesting the specific service is defined by the API, the connection unit 121 mediates the application 110 and the engine 126 such that, when the application 110 calls a specific API, the engine 126 performs the specific service for the specific API. In such a case, the connection unit 121 can provide or support various APIs such as a AWT connection unit 122, a HAVi API 123, a JavaTV API 124 and a DVR API 125.

The engine 126 performs a service according to the request transmitted from the connection unit 121 and provides the result to the connection unit 121. The engine 126 includes an AWT 127, a HAVi 128, a Java TV 129 and a DVR 131. The AWT 127, the HAVi 128, the Java TV 129 and the DVR 131 are specific service modules, which are respectively executed when the AWT connection unit 122, the HAVi API 123, the JavaTV API 124 and the DVR API 125 are called, and transmit or receive data to or from another service module or controls and operates the hardware to perform a specific service.

The middleware 120 may be, for example, an OpenCable Application Platform (OCAP), and the application 110 may be, for example, an OCAP application.

The OCAP is a data broadcast-associated application platform employed in an open cable scheme, and provides a high-level service to the applications 110 and 130 using a hardware resource and an operating system.

In addition, the engine 126 may include an execution engine and a presentation engine. The execution engine analyzes and executes an application prepared by Java, and the representation engine analyzes and executes an application prepared by a hyper text markup language (HTML). For example, an OCAP-J (Java) application is performed by the execution engine.

In the below-described other embodiments as well as the first embodiment, for ease of description and convenience of understanding, it is assumed that the application associated with the data broadcast is the OCAP application. Accordingly, the range of the present invention is not limited to the OCAP data broadcast standard and is applicable to the other data broadcast standards, which will become apparent from claims of the present specification.

For example, the present invention is applicable to a data broadcast using terrestrial waves or satellites as well as cables. That is, the broadcast receiver 100 according to the present invention allows a user to operate a "TV/Video" button of a local key or a remote controller such that a terrestrial broadcast mode (antenna), a satellite broadcast mode, a cable broadcast mode (cable), a video 1, a video 2 or the like is input.

The application is classified into a data broadcast-associated application 110 and a native application 130.

The data broadcast-associated application 110 uses the connection unit 121 in order to utilize hardware resources. That is, by allowing the data broadcast-associated application 110 to utilize the hardware resources via the connection unit 121 without directly treating the hardware resources, compatibility between the application 110 and the hardware 150 is maintained. For compatibility of the data broadcast-associated application 110, the middleware 120 separates the data broadcast-associated application 110 from the hardware 150.

The data broadcast-associated application 110 refers to software which operates based on an execution environment defined in the engine 126 and the connection unit 121 and, due to this reason, may be also called an OCAP application.

The data broadcast-associated application 110 includes a bound application 112, an unbound application 114, and a monitor application 116.

The bound application 112 is an application associated with a currently tuned channel or bound to a tuned channel, and includes, for example, games, information services and so on. At this time, if channel switching occurs and the application is not associated with a newly tuned channel, the bound application 112 is finished. That is, the bound application 112 is started in a specific channel and, if the channel is switched to another channel, the bound application 112 is finished.

The unbound application 114 is an application which is not bound to a specific channel, and includes, for example, an Electronic Program Guide (EPG) 117, a Video On Demand (VOD) 118, a Watch TV (119), an E-mail chatting, a game, a web browser, a Personal Video Recorder (PVR) and so on. The unbound application 114 is downloaded and stored or updated when the broadcast receiver 100 is booted, and is started and finished regardless of a viewed channel.

The EPG 117 may include a Watch TV program property for performing most basic functions of the broadcast receiver, such as channel up/down and so on, as well as a general TV guide function. Furthermore, a service such as pay-per-view may be performed using the EPG.

The VOD 118 performs a general VOD function. For example, the VOD performs a function such as a Real VOD (RVOD), a Near VOD (NVOD), or the like. If a hard disc is present, the VOD may be implemented using the hard disc.

The Watch TV 119 is a program to perform a basic operation for watching TV. The Watch TV performs an operation similar to a function performed by the existing native application.

The monitor application 116 is service operation software using the API defined in the OCAP standard and can adjust the start and the end of the other applications. That is, the monitor application 116 is a special unbound application which is manufactured according to the purpose of a multiple system operator (MSO), and an API (for example, the rebooting of the broadcast receiver 110, the report of an error, or the like) which can be used by only the monitor application 116 is provided to the monitor application 116. In addition, the monitor application 116 can adjust the resources of the broadcast receiver 100, such as a memory and so on, when a collision between various applications occurs, and exercise a preferential control right with respect to substantially all functions of the broadcast receiver 100.

The monitor application 116 may control channel management and a cablecard function. That is, the basic channel switching and operation of a host into which a cablecard is inserted are basically controlled by the monitor application 116. In addition, the monitor application 116 may download and execute applications for the driving of the broadcast receiver 100 or the supplementary services (EPG, VOD or the like).

For example, in a data broadcast mode, when the operating system 140 sends a channel switching key input from an input device such as a remote controller to the middleware 120, the monitor application 116 executes the change of the states of various other applications associated with the channel switching, and executes the pause and end of the bound application 112 dedicated to the channel, according to the channel switching key received from the middleware 120.

Figure 2:
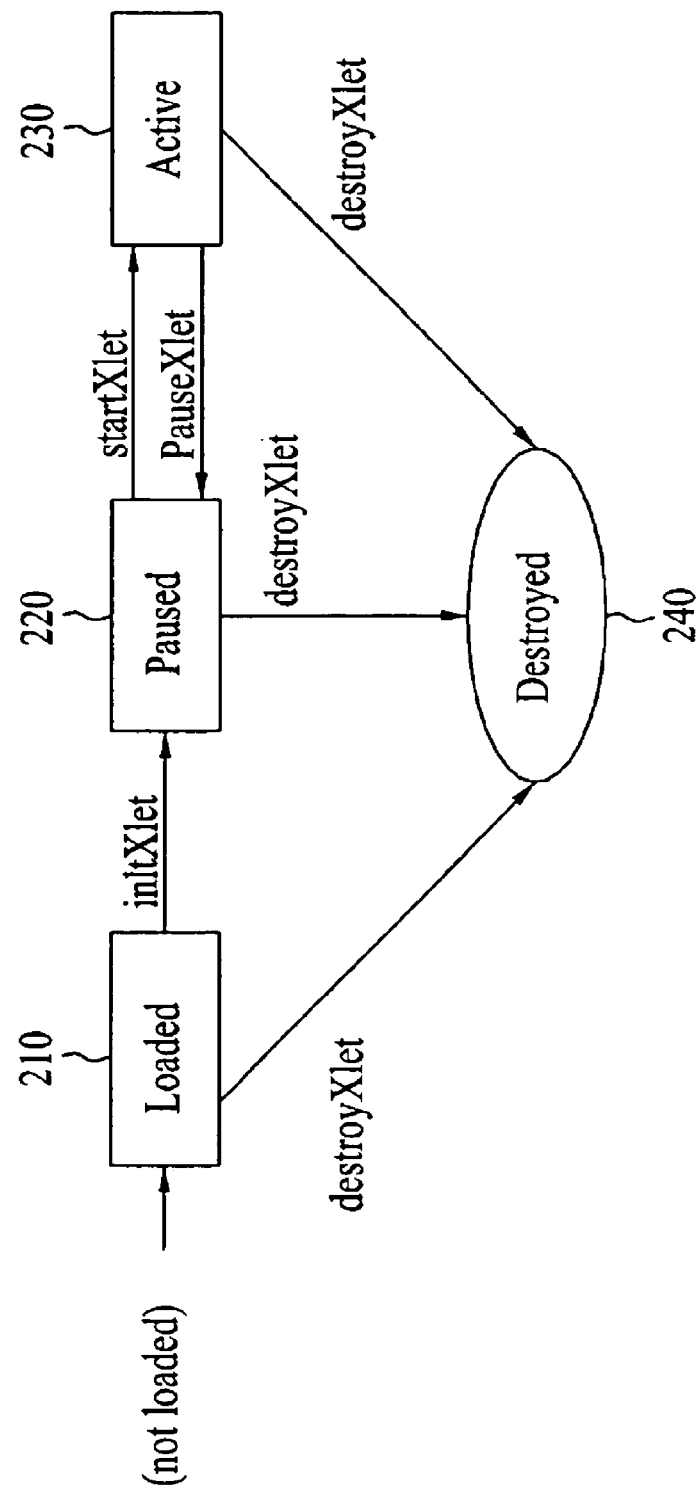
FIG. 2 is a conceptual diagram showing an example of a life cycle of a data broadcast-associated application 110.

FIG. 2 is a conceptual diagram showing an example of a life cycle of the data broadcast-associated application 110.

Referring to FIG. 2, the data broadcast-associated application 110 may be implemented by a Java application. If the data broadcast-associated application 110 is implemented by the Java application, the broadcast receiver 100 according to the present invention may download and install the implemented Java application (Xlet) from a broadcasting station. The downloaded Java application (Xlet) has a life cycle.

The downloaded Java application (Xlet) is initialized after being loaded (210) in a memory. After the downloaded Java application is initialized, the application becomes a paused state 220. Thereafter, the downloaded Java application (Xlet) is started by itself or by another Xlet and becomes an active state (230). The downloaded Java application (Xlet) may become the paused state (220) or a destroyed state (240) by itself or by another Xlet even in the active state.

At this time, in order to allow another Xlet to set this specific Xlet to the paused state (220) or the destroyed state (240), a pause or a stop function should be called via an org.dvb.application.AppProxy object.

The org.dvb.application.AppProxy object determines whether or not the called application has a right for the pause, destroy or stop of the application, and, if the called application does not have the right, an error occurs. The org.dvb.application.AppProxy object is not software which is transmitted and downloaded by an MSO or the like, but is software which is installed by a TV manufacturer before shipment of a TV receiver.

The native application 130 performs a general function for receiving a digital broadcast signal, demultiplexing video and audio information and the other broadcast program information (EPG) from the received digital broadcast signal, and implementing the information on a device. That is, the native application 130 is an application associated with the basic function, and is installed before shipment of the broadcast receiver 100.

The native application 130 may communicate with the middleware 120 and the application 110, and an example of a communication method may include, for example, a Java Native Interface (JNI). The JNI is an interface which is necessary when a program prepared by Java uses software prepared by C or C++ language or a program prepared by C or C++ language uses software prepared by Java, and is supported by a Java virtual machine 142.

The hardware 150 is also called a host device hardware, includes a set-top-box and a cablecard, and is generally set by a TV manufacturer upon initial production. In addition, the hardware 150 may further include a hard disc 151. The hard disc may be an internal hard disc or an external hard disc connected by a parallel port or a USB port.

The cablecard is a security function and a conditional access function separated from the set-top-box and is also called a Point of Deployment (POD) module. For example, a PCMCIA card is used as the cablecard. The set-top-box into which the cablecard is inserted is also called a host. For example, a digital built-in TV or a digital ready TV corresponds to the host. The set-top-box includes a tuner 152, a video decoder 153, an audio decoder 154 and graphics (OSD) 155.

The operating system 140 manages or controls the hardware 150, the middleware 120 and the applications 110 and 130, and performs an interface function between the hardware 150 and the middleware 120. In the operating system 140, a device driver 141 for driving the hardware such as the tuner 152, the video decoder 153, the audio decoder 154 and so on may be installed, a Java virtual machine 142 for executing a Java program may be installed, and the other software 143 may be installed. As the operating system 140, a general-purpose operating system such as Windows, Windows NT, Linux, Unix, OS/2, MAC OS or the like may be used, and an operating system which is obtained by correcting the general-purpose operating system or is newly developed as a dedicated operating system of the broadcast receiver 100 according to the present invention may be used.

Figure 3:
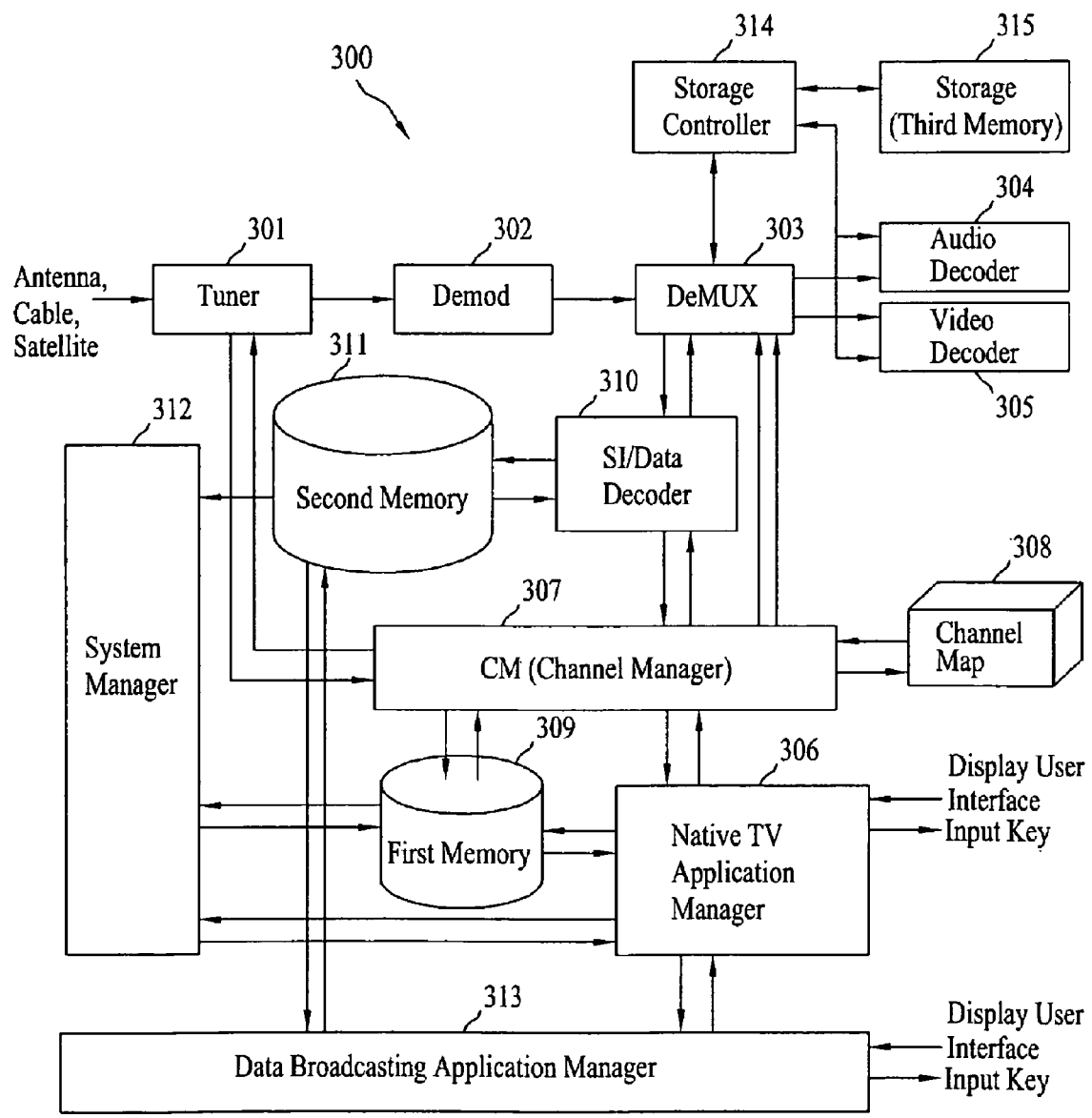
FIG. 3 is a block diagram showing the configuration of a broadcast receiver according to an exemplary embodiment of the present invention.

FIG. 3 is a block diagram showing the configuration of a broadcast receiver according to an exemplary embodiment of the present invention.

Referring to FIG. 3, the broadcast receiver 300 according to the present invention includes a tuner 301, a demodulating unit 302, a demultiplexer 303, an audio decoder 304, a video decoder 305, a native TV application manager 306, a channel manager 307, a channel map 308, a first memory 309, an SI and/or data decoder 310, a second memory 311, a system manager 312, a data broadcasting application manager 313, a storage controller 314, and a third memory 315. The first memory 309 is a non-volatile memory (NVRAM) (or a flash memory), and the third memory 315 is a mass storage device such as a hard disc drive (HDD) or a memory chip. The native TV application manager 306 is a component corresponding to the native application 130, the system manager 312 and the data broadcasting application manager 313 are components corresponding to the monitor application 116, and the channel manager 307 and the storage controller 314 are components corresponding to the middleware 120. The third memory 315 is a component corresponding to the hard disc 151.

The tuner 301 tunes into the frequency of a specific channel via any one of an antenna, a cable and a satellite, down-converts a signal into an intermediate frequency (IF) signal, and outputs the IF signal to the demodulating unit 302. At this time, the tuner 301 is controlled by the channel manager 307 and reports the result and the strength of the broadcast signal of the tuned channel to the channel manager 307.

Data received with the frequency of the specific channel may include audio data and video data. Such audio data and video data are compressed by various types of encoders and are transmitted from a broadcasting station. In this case, a receiver includes the audio decoder 304 and the video decoder 305 in correspondence with the encoder used for compression, and the audio data and the video data are respectively decoded by the decoders 304 and 305 and video and audio are provided to a user. An encoding/decoding scheme for the audio data includes, for example, AC 3, MPEG 2 AUDIO, MPEG 4 AUDIO, AAC, AAC+, HE AAC, AAC SBR, MPEG-Surround, and BSAC, and an encoding/decoding scheme for the video data includes, for example, MPEG 2 VIDEO, MPEG 4 VIDEO, H.264, SVC, and VC-1.

According to the embodiments, data for a data service, for example, data for a Java application, data for a HTML application and data for an XML may be received. Such data for the data service may be Java class files for the Java application or a URL file indicating the locations of such files. In addition, the data for the data service may be audio files or video files used in respective applications. According to the embodiments, the received data may be metadata. Such metadata may be, for example, described by an XML and be transmitted via a DSM-CC protocol.

A broadcast service which can be provided using the received data includes, but not limited to, a weather service, a traffic service, a stock service, a viewer participation quiz program, a real-time public-opinion poll, an interactive type education broadcast, a game service, an information provision service for a drama synopsis, characters, background music and a photo place, an information provision service for a score of a sports event and a profile and a record of a player, a service for production information and the order thereof, an information provision service for a program according to media, times, or theme.

The demodulating unit 302 performs demodulation and channel equalization with respect to the signal output from the tuner 301 and outputs the demodulated signal to the demultiplexer 303 in the unit of TS packets.

The storage controller 314 is interfaced with the demultiplexer 303 and controls instant recording, reserve recording, time shift of broadcasting contents, or the like. For example, when any one of the instant recording, the reserve recording and the time shift is set in the broadcast receiver 300 according to the present invention, the broadcasting contents input to the demultiplexer 303 are stored in the third memory 315 under the control of the storage controller 314. The third memory 315 may be divided into a temporary memory region for a time shift function and/or a permanent memory region for permanently storing data according to the selection of the user.

If the reproduction of the data stored in the third memory 315 is necessary, the storage controller 314 reads the data stored in the third memory 315 and outputs the data to the demultiplexer 303.

At this time, since the storage capacity of the third memory 315 is restricted, for efficiency of the storage capacity, the storage controller 314 stores the data, which is input in a state of being compressed and encoded, in the third memory 315, without conversion, in one embodiment of the present invention. In this case, the data read from the third memory 315 according to a reproduction command is input to the decoder via the demultiplexer 303 and is restored to an original state.

In addition, the storage controller 314 may control play, fast forward, rewind, slow motion, instant replay or the like of the data which is stored in the third memory 315 or is currently being buffered. The instant replay is a function for repeatedly viewing a scene which is desired to be viewed again and the instant replay may be performed with respect to data which is received in real time as well as the stored data, in association with the time shift function.

The storage controller 314 may compress and encode input data and store the data in the third memory 315 if the input data is analog type data, for example, if a transmission scheme is NTSC, PAL or the like. The storage controller 314 may include an encoder, and the encoder may be implemented by at least one of software and hardware. The encoder may be implemented by an MPEG encoder as one embodiment of the present invention. The encoder may be included on the outside of the storage controller 314.

Meanwhile, the storage controller 314 may scramble (or encrypt) the input data and store the scrambled data in the third memory 315, in order to prevent the data from being illegally copied when the input data is stored in the third memory 315. In this case, the storage controller 314 may include a scrambling algorithm for scrambling the data stored in the third memory 315 and a descrambling algorithm for descrambling (or decrypting) the data read from the third memory 315. As the scrambling method, data to be scrambled may be modified using any key (e.g., a control word) or a method of mixing signals may be used.

The demultiplexer 303 receives real-time contents output from the demodulating unit 302 or data read from the third memory 314 and performs demultiplexing.

The demultiplexer 303 demultiplexes data and a system information (SI) table for a data service from input data packets under the control of the SI and/or data decoder 310. The demultiplexed data and SI table are output to the SI and/or data decoder 310 in the form of a section.

In order to retrieve and decode data for the data service from a channel, SI is necessary. Such SI is also called service information, if necessary. The SI may include channel information, event information, and so on.

Although program specific information/program and system information protocol (PSI/PSIP) is used as the SI in the embodiment of the present invention, the present invention is not limited to this. That is, a protocol which transmits the SI in a table format is applicable to the present invention regardless of the name thereof.

The PSI is an MPEG-2 system standard defined for classifying channels and programs, and the PSIP is the Advanced Television Systems Committee (ATSC) standard which can classify channels and programs. As one embodiment of the present invention, the PSI may include a Program Association Table (PAT), a Conditional Access Table (CAT), a Program Map Table (PMT) and a Network Information Table (NIT).

The PAT corresponds to special information that is transmitted by a data packet having a PID of "0". The PAT transmits PID information of the PMT and PID information of the NIT corresponding to each program. The CAT transmits information on a pay broadcast system used by a transmitter. The PMT transmits PID information of a transport stream (TS) packet, in which program identification numbers and individual bit sequences of video and audio data configuring a program are transmitted, and the PID information, in which PCR is transmitted. The NIT transmits information of the actual transmission network.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The VCT transmits information about a virtual channel, for example, channel information for selecting a channel and information about a packet identifier (PID) for receiving audio and/or video data. That is, when the VCT is parsed, a channel name, a channel number, and the PID of the audio and the video data of a broadcasting program carried in the channel can be known.

The data for the data service detected by the demultiplexer 303 based on the SI, for example, the data for the application may be stored in the second memory 311 by the SI and/or data decoder 310.

The SI and/or data decoder 310 collects sections having the same table identifier (table_id) and configures and parses a table, and stores SI, which is the parsed result, in the second memory 311.

At this time, the SI and/or data decoder 310 reads and stores all actual section data portions, which are not section-filtered by the demultiplexer 303 upon parsing, in the second memory 311. The second memory 311 is a table and data/object carousel database for storing service data parsed from a DSM-CC section and SI parsed from the table.

It is determined whether one table includes one section or a plurality sections, from a table_id field, a section_number field, and a last_section_number field of the table. For example, when only TS packets having the PID of the VCT are collected, a section is configured and, when sections having table identifiers allocated to the VCT are collected, the VCT is configured.

When the VCT is parsed, information about a virtual channel in which data is transmitted can be obtained.

According to the present invention, the SI and/or data decoder 310 parses an SLD of the VCT and transmits stream type information of corresponding elementary streams to the audio decoder 304 or the video decoder 305. In this case, the audio decoder 304 or the video decoder 305 performs an audio or video decoding operation using the transmitted stream type information.

According to the present invention, the SI and/or data decoder 310 parses an AC-3 audio descriptor, an MPEG 2 audio descriptor, an MPEG 4 audio descriptor, an AAC descriptor, an AAC+ descriptor, a HE AAC descriptor, an AAC SBR descriptor, an MPEG surround descriptor, a BSAC descriptor, an MPEG 2 video descriptor, an MPEG 4 video descriptor, a H.264 descriptor, a SVC descriptor, and a VC-1 descriptor of an event information table (EIT), and transmits audio or video codec information of a corresponding event to the audio decoder 304 or the video decoder 305. In this case, the audio decoder 304 or the video decoder 305 performs an audio or video decoding operation using the transmitted audio or video codec information.

Application identification information, service component identification information and service information of the data service acquired by the SI and/or data decoder 310 may be stored in the second memory 311 or may be output to the data broadcasting application manager 313.

The application identification information, the service component identification information and the service information may be referred to for decoding the data for the data service or may be used for preparing the driving of the application program for the data service in advance.

The SI and/or data decoder 310 may control the demultiplexing of an SI table which is information associated with a channel and an event and transmit an A/V PID list to the channel manager 307.

The channel manager 307 may request the SI and/or data decoder 310 to receive a system-associated information table by referring to the channel map 308, and receive the result. The channel manager 307 may control the channel tuning of the tuner 301.

The channel manager 307 may directly control the demultiplexer 303, and may directly set the A/V PID to control the audio and video decoders 304 and 305.

The audio and video decoders 304 and 305 may respectively decode audio and video data demultiplexed from main service data packets and output the decoded audio and video data or may decode audio and video data demultiplexed from service data packets and output the decoded audio and video data. According to the embodiment, when audio data and video data as well as the data for the data service are included in the received data, the audio data and the video data demultiplexed by the demultiplexer 303 may be respectively decoded by the audio decoder 304 and the video decoder 305. For example, the audio decoder 304 may perform decoding using an AC-3 decoding algorithm, an MPEG 2 audio decoding algorithm, an MPEG 4 audio decoding algorithm, an AAC decoding algorithm, an AAC+ decoding algorithm, a HE AAC decoding algorithm, an AAC SBR decoding algorithm, an MPEG surround decoding algorithm, and a BSAC decoding algorithm, and the video decoder 305 may perform decoding using an MPEG-2 video decoding algorithm, an MPEG 4 video decoding algorithm, a H.264 decoding algorithm, an SVC decoding algorithm, and a VC-1 decoding algorithm.

The native TV application manager 306 drives a native application program stored in the first memory 309 and performs a general function such as channel switching. The native application program is software which is installed before shipment of a receiving system.

The native TV application manager 306 displays a graphic user interface (GUI) on a screen when the user's request is input to the broadcast receiver via a user interface (UI).

The UI receives the user's request via an input device such as a remote controller, a key pad, a jog dial or a touch screen provided on a screen and outputs the user's request to the native TV application manager 306 and the data broadcasting application manager 313.

The native TV application manager 306 controls the channel manager 307, performs a channel associated operation, that is, the management of the channel map 308, and/or controls the SI and/or data decoder 310. The native TV application manager 306 stores and restores the whole GUI control of the broadcast receiver, the user's request and the state of the broadcast receiver in and from the first memory 309.

The channel manager 307 controls the tuner 301 and the SI and/or data decoder 310 and manages the channel map 308 according to the channel request of the user.

That is, the channel manager 307 requests the SI and/or data decoder 310 to parse a table associated with a channel to be tuned, and receives the result of parsing the table from the SI and/or data decoder 310. The channel manager 307 updates the channel map 308 according to the reported parsed result, and sets a PID for demultiplexing a table associated with the data for the data service from the service data in the demultiplexer 303.

The system manager 312 controls the booting of the broadcast receiver by turning on/off a power source and stores a ROM image (including a downloaded software image) in the first memory 309.

That is, the first memory 309 stores an application program for performing a data service function and an operating system such as the operating system necessary for operating the broadcast receiver.

The application program is a program for processing the data for the data service stored in the second memory 311 and providing the data service to the user. If the data for the data service is stored in the second memory 311, the data is processed by the application program or another application program and is provided to the user.

The operating program and the application program stored in the first memory 309 may be updated or corrected by a newly downloaded program. Since the stored operating program and application program are continuously stored even when the supply of the power is stopped, the programs may be executed when power is applied, without newly downloading the programs.

The application program for providing the data service according to the present invention may be installed in the first memory 309 before shipment of the broadcast receiver or may be stored in the first memory 309 by downloading. In addition, the application program for the data service stored in the first memory 309, that is, the data service provision application program, may be deleted, updated or corrected. In addition, the data service provision application program may be downloaded and executed together with the data for the data service, whenever the data for the data service is received.

When the data service is requested by the UI, the data broadcasting application manager 313 drives the corresponding application program stored in the first memory 309, processes the requested data, and provides the data service to the user. For such a data service, the data broadcasting application manager 313 supports the GUI. The data service is provided in the form of text, voice, graphics, a still picture, a moving picture or the like.

The data broadcasting application manager 313 may use a virtual machine for executing the application program stored in the first memory 309. The virtual machine may be, for example, a Java virtual machine for executing a Java program.

Figure 4:
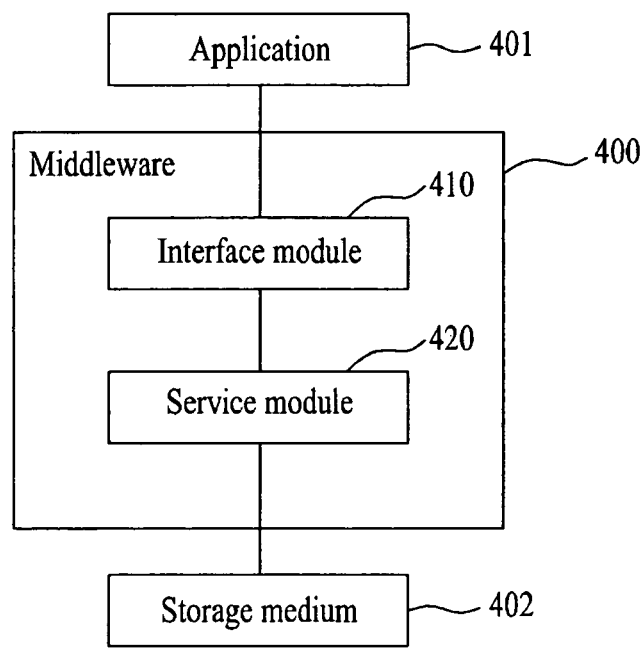
FIG. 4 is a block diagram showing the configuration of a middleware according to an exemplary embodiment of the present invention.

FIG. 4 is a block diagram showing the configuration of a middleware according to an exemplary embodiment of the present invention.

Referring to FIG. 4, the middleware 400 according to the present invention corresponds to the middleware 120 and includes an interface module 410 and a service module 420. The interface module 410, the service module 420 and a storage medium 402 are components which respectively correspond to the connection unit 121, the engine 126 and the hard disc 151. That is, the service module 420 may be implemented according to the OCAP standard and the interface module 410 may include the API defined in the OCAP standard. For example, the storage controller 314 of the broadcast receiver 300 according to the present invention may perform the function of the middleware 400, and the third memory 315 of the broadcast receiver 300 according to the present invention may perform the function of the storage medium 402.

The interface module 410 transmits or receives information or a command to or from a data broadcast-associated application 401. When the application 401 transmits a record list request command, the interface module 410 receives the record list request and transmits the received record list request to the service module 420. When the service module 420 transmits a list of records associated with the record list request, the interface module 410 transmits the list of records transmitted by the service module 420 to the application 401 as a response to the record list request command transmitted by the application 401.

Here, the record list request command may be a command for requesting a list of all records, a command for requesting a list of records satisfying a specific condition among all the records, or a command for requesting a list of records belonging to a specific series among all the records. In addition, the series refers to video materials which are broadcasted in series, such as drama series, among broadcast materials, and the records belonging to the series refer to records obtained by recording the video materials which are broadcasted in series. That is, the records belonging to the series refer to records obtained by recording the episodes of drama series whenever the episodes of the drama series are broadcasted.

Information about the records included in the list of records may be information for identifying the records or the guide information of the records. The information for identifying the records includes an ID, a name and so on. The ID refers to a string including characters, numbers, symbols or the like, which is allocated to each of the records in order to distinguish the records. The guide information of the records is information for introducing the records, and includes a title, a kind, a reproduction time, producer information and actor information of records. The kind of the records refers to drama, movie, news, documentary, sports events, and show programs. In particular, if the kind of the records is movie, the guide information of the records may include information about the genre of the movie, such as martial arts, fantasy, horror, comic, and drama.

The guide information of the records may be received from a broadcasting station or may be stored in association with the records recorded when the broadcast receiver 300 records a broadcast program. For example, the guide information of the records may be stored based on information provided by an electronic program guide (EPG).

The service module 420 receives the information or the command transmitted by the application 401 via the interface module 410. The service module 420 performs an operation associated with the received command and transmits the performed result to the interface module 410 such that the interface module 410 transmits the performed result to the application 401. For example, the service module 420 may receive the record list request command from the interface module 410. If the record list request command is received, the service module 420 may calculate a desired list of records from the list of stored records and transmit the calculated list to the interface module 410 as a response to the record list request command. The list of stored records refers to a list of records which are stored by the broadcast receiver 300 according to the present invention. If the broadcast receiver 300 performs recording reservation, execution and completion, the information about the records is stored in the list of records or the information about the records is corrected in the list of records.

The service module 420 may filter the list of stored records based on a link between the objects of the records, in order to calculate the desired list of records from the list of stored records, as the response to the record list request command. The link between the objects may be an inheritance relationship and a sibling relationship.

The object conceptually includes data (entity) and an operation (a procedure, a method and a function) associated with that data in an object-oriented programming or design. By considering the records included in the list of stored records as data and generating the objects including the operations associated with the records, the records may be managed using the generated objects.

In the object-oriented programming or design, the inheritance refers to an effect in which data defined in an inheriting object and an operation associated with that data seem to be defined in an inherited object without separately defining the data defined in the inheriting object and the operation associated with that data in the inherited object. The inherited object is called a children object and the inheriting object is called a parent object. If the inheritance between the objects is generated, both the objects have the inheritance relationship. When objects inherit from the same parent object, such objects have a sibling relationship.

Accordingly, when the service module 420 receives a record list request command associated with a specific object as the record list request command, the service module 420 may detect records managed by the object associated with the specific object from the list of stored records and generate a list of detected records. The service module 420 may newly generate an object for managing the list of records.

For example, when the application requests a list of records belonging to a specific series, the service module 420 may receive information about an object for managing the specific series by the record list request command. Then, the service module 420 detects an object having the inheritance relationship with the object for managing the specific series from the objects for managing the records included in the list of stored records, and calculates a list of records managed by the detected object. That is, the service module 420 detects a children object of the object for managing the specific series, and calculates the list of records managed by the detected object.

As another example, when the application requests a list of records belonging to the same series as a specific record, the service module 420 may receive information about an object for managing the specific record by the record list request command. Then, the service module 420 detects an object having the sibling relationship with the object for managing the specific record from the objects for managing the records included in the list of stored records, and calculates a list of records managed by the detected object.

Then, the service module 420 transmits the calculated list of records to the interface module 410. For example, the service module 420 may generate the object for the calculated list of records and transmit information about the generated object to the interface module 410.

The application 401 receives the list of records calculated by the service module 420 from the interface module 410 with respect to the record list request command, and displays the list of records.

Figure 5:
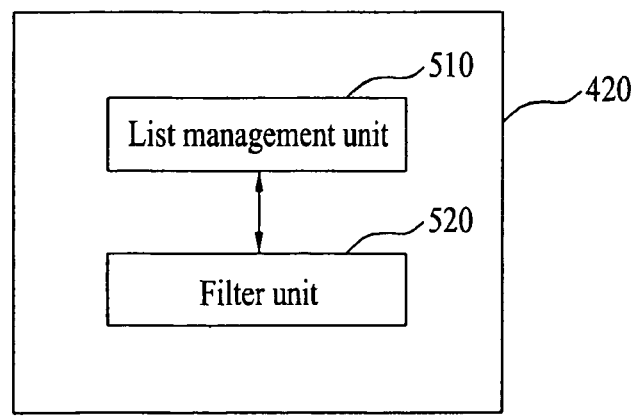
FIG. 5 is a block diagram showing the configuration of a service module according to an exemplary embodiment of the present invention.

FIG. 5 is a block diagram showing the configuration of a service module according to an exemplary embodiment of the present invention.

Referring to FIG. 5, the service module 420 includes a list management unit 510 and a filter unit 520. The list management unit 510 manages a list of records. The list management unit 510 may manage a list of records, of which recording is reserved, and a list of records, of which recording is being performed, as well as a list of records, of which recording is completed, and provide the list of records of which recording is reserved, and the list of records, of which recording is being performed, to the application 401.

When the list management unit 50 receives the record list request command from the interface module 410, the list management unit 510 calls the filter unit 520 and enables the filter unit to filter the list of records which are being managed. The list management unit 510 receives the filtered result value from the filter unit 520 and calculates the list of records associated with the record list request command based on the received result value. The result value may be a value indicating whether or not each of the records included in the list of records satisfies the specific condition, such as true or false.

The list management unit 510 transmits the calculated list of records to the interface module 410.

The filter unit 520 filters the list of stored records and detects records satisfying the specific condition. The filter unit 520 may use a link condition between the objects of the records and a link condition between the records as a filtering condition. The link condition between the objects includes an inheritance relationship, a sibling relationship, and a family relationship.

The link between the records includes a link of an attribute and a link of an attribute value. The attribute of the records refers to the kind of information about records or the item of information about the records. For example, the kind or the item of the information about the records refers to a title, a kind, a genre, a producer, an actor, and a reproduction time of records. The attribute value of the records refers to information about the attribute of the records. For example, a record title attribute has an attribute value "New Heart", a record kind attribute has an attribute value "drama", and a record genre attribute has an attribute value. "melodrama". As described above, the information about the records may be the information for identifying the records or the guide information of the records.

The link of the attribute indicates that the records have the same attribute. When all the attributes of the records are identical, the identity of the attribute may be recognized and, even when a portion or any one of the attributes of the records is identical, the identity of the attribute may be recognized. That is, a criterion for determining the link of the attribute may vary according to circumferences.

The link of the attribute value conceptually includes the identity of the attribute value and the partial identity of the attribute value. The link of the attribute value conceptually includes the link between two or more attribute values. For example, if both the genre attributes of two records are drama, the link of the attribute value is recognized in the two records.

Figure 6:
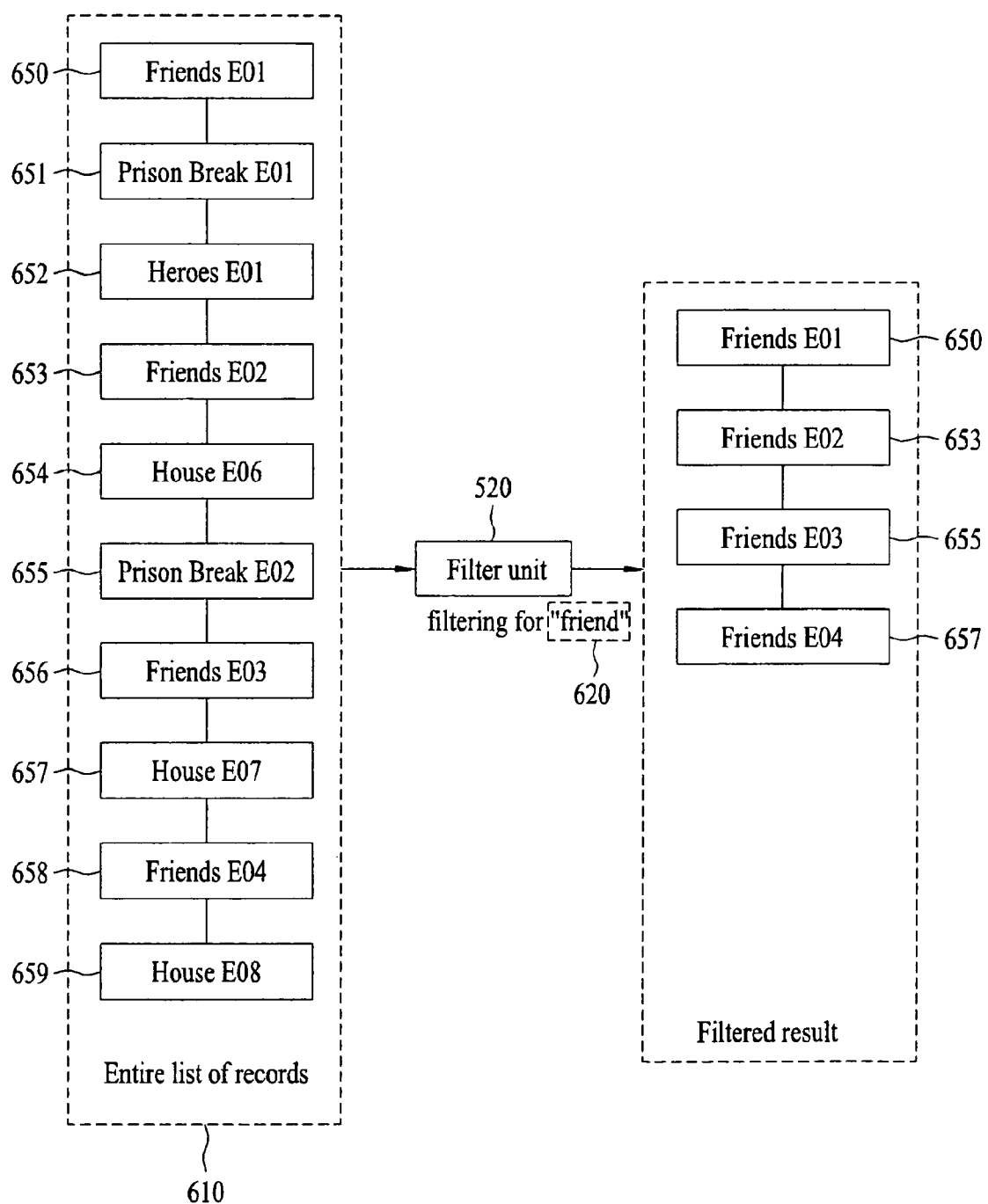
FIG. 6 is a conceptual diagram showing a process of filtering a list of stored records and calculating a list of records satisfying a specific condition by a middleware according to the present invention.

FIG. 6 is a conceptual diagram showing a process of filtering a list of stored records and calculating a list of records satisfying a specific condition by a middleware according to the present invention.

Referring to FIG. 6, the list management unit 510 manages the entire list of records 610. When the interface module 410 transmits the record list request command, the list management unit 510 calls the filter unit 520. The list management unit 510 receives an attribute value "Friend" of a name attribute belonging to information for identifying the records among the record attributes as a record list request command for records belonging to "Friend" 620 which is a drama series. The list management unit 510 may directly receive the attribute value or receive information capable of accessing the attribute value.

The filter unit 520 determines whether or not the partial identity between the attribute value of the name attribute of the records 650 to 659 belonging to the list of records managed by the list management unit 510 and the attribute value "Friend" of the name attribute received by the list management unit 510 is recognized, such that the link between the records is examined. The filter unit 520 detects the records 650, 653, 656 and 657 of which the partial identity is recognized. The list management unit 510 calculates a list of records 650, 653, 656 and 657 detected by the filter unit 520.

FIG. 7 is a view showing an example of details of the API of the interface module.

Referring to FIG. 7, the interface module 410 which receives the record list request command from the application 401 and transmits the guide information of the records to the application 401 as the response thereto may be represented by a Class SeriesRecordingFilter 700. The SeriesRecordingFilter 710 is declared by the class and inherits a RecordingListFilter 720 defined in an org.ocap.shared.dvr.navigation. A method SeriesRecordingFilter(RecordingRequest recordingRequest) 730 is a generator which generates a SeriesRecordingFilter object. The recordingRequest input as a parameter is a ParentRecordingRequest object, is stored as the internal attribute value of the SeriesRecordingFilter, and is used as a comparison value of a filtering condition. The application 401 calls the SeriesRecordingFilter(RecordingRequest recordingRequest) 730 and sets a condition for the list of records which will be received from the interface module 410. That is, the application 401 may call the SeriesRecordingFilter(RecordingRequest recordingRequest) 730 based on the ParentRecordingRequst for the specific series as the recordingRequest and set the condition for the list of records such that the list of records belonging to the specific series is received from the interface module 410.

If the parent object of the RecordingRequest input by a parameter entry is the same object as a comparison value object of the SeriesRecordingFilter set in the SeriesRecordingFilter(RecordingRequest recordingRequest) 730 which is the generator, a method Boolean accept(RecordingRequest entry) 740 returns true because the RecordingRequest object input by the parameter entry and the comparison value object of the SeriesRecordingFilter have the inheritance relationship, and, if so not, returns false.

The application 401 calls filter=SeriesRecordingFilter(RecordingRequest recordingRequest) 730 and calls the RecordingList.filterRecordingList(RecordingListFilter filter)API, in order to transmit the recording list request command to the interface module 410.

When the interface module 410 receives the calling of the RecordingList.filterRecordingList(RecordingListFilter) API 730 defined in the OCAP standard, the interface module 410 requests the list management unit 510 to filter the list of managed records based on the filter set by the application 401 and to calculate the list of requested records. The service module 420 may further include an AppIDFilter, an OrdIDFilter and a RecordingStateFilter in the SeriesRecordingFilter, as a filter used for filtering the RecordingRequest.

The AppIDFilter is used for filtering only the RecordingRequests having a specific application ID. If several applications 401 perform recording, each of the applications 401 may insert its application ID into the AppIDFilter and extract only that requested by itself from many RecordingRequests. The application ID refers to an ID for distinguishing the data broadcasting applications. The application ID internally includes two numbers of oid and aid. The oid is an ID for identifying the manufacturers, and the applications of the same manufacturer have the same oid. The aid is an ID for distinguishing the applications of the same manufacturer. When the RecordingRequest is generated, the application ID is included and is the ID of the application which calls the RecordingManager.record( ).

The OrgIDFilter is used to check only the oid instead of all the application IDs and extract all the RecordingRequests requested by the applications of the same manufacturer.

The RecordingStateFilter is a filter for the current state ("reserved", "recording", "recorded" or the like) of the RecordingRequest. Only the RecordingRequest in the recording state or the recorded state may be extracted using the RecordingstateFilter.

Then, the list management unit 510 calls the accept(RecordingRequest entry) 740 with respect to the RecordingRequest which is the object for managing the records belonging to the RecordingList which is the object for managing the list of stored records, selects only the RecordingRequests which returns true, and returns a new RecordingList. That is, the list management unit 510 allocates the RecordingRequest which is the object for managing the records belonging to the RecordingList by the entry, and calls the accept(RecordingRequest entry) 740.

A RecordingRequest getFilterValue 750 returns the RecordingRequest object which is used as the comparison value of the SeriesRecordingFilter set in the SeriesRecordingFilter(RecordingRequest recordingRequest) 730 of the generator.

Figure 8:
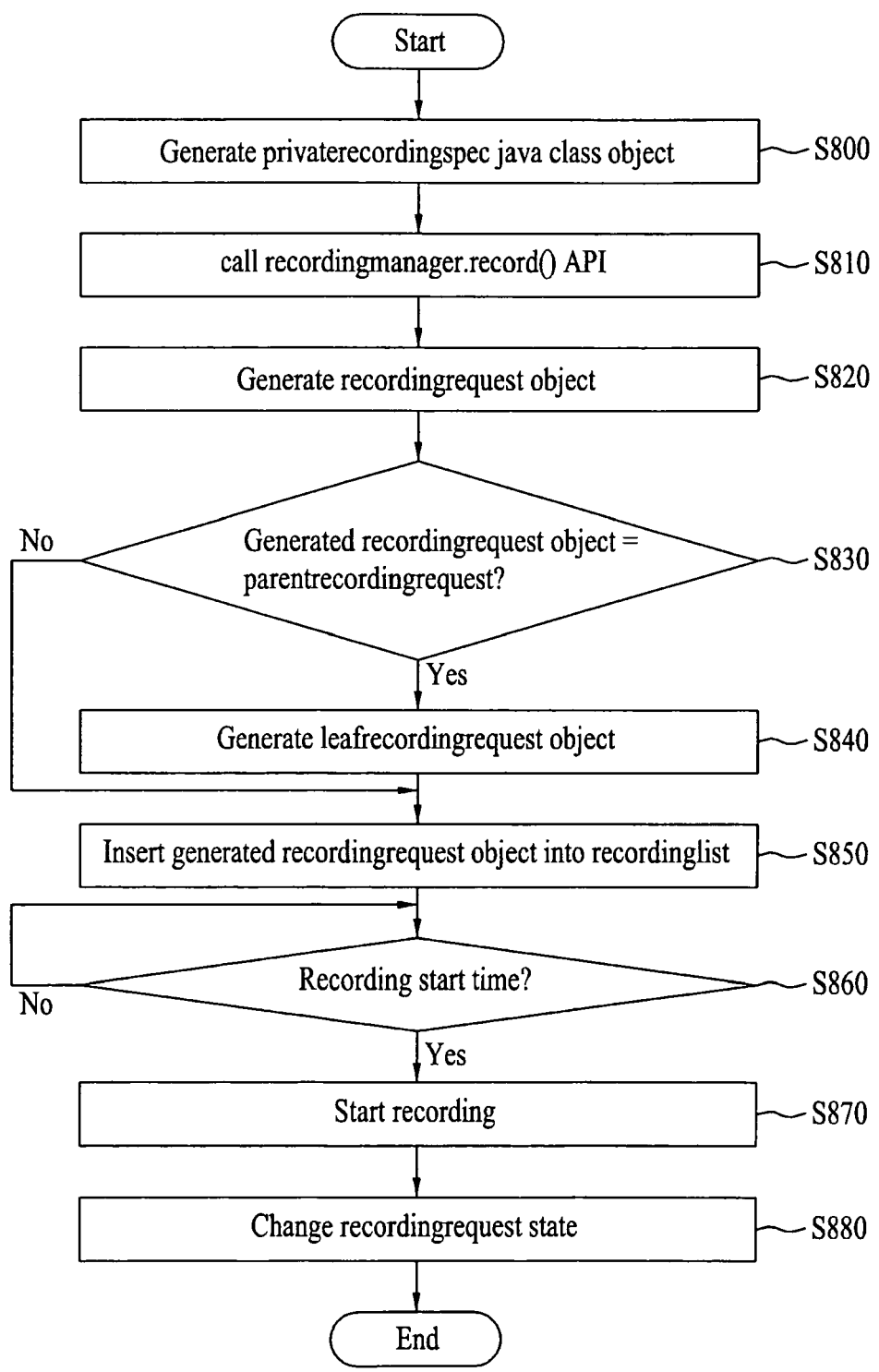
FIG. 8 is a flowchart illustrating a recording process performed by a broadcast receiver according to an exemplary embodiment of the present invention.

FIG. 8 is a flowchart illustrating a recording process performed by a broadcast receiver according to an exemplary embodiment of the present invention.

Referring to FIG. 8, the application 401 generates a PrivateRecordingSpec Java Class object including information necessary for recording, such as channel information, a start time, and an end time (S800). Then, the application 401 calls the OcapRecordingManager.record( ) API of the interface module 410 (S810). The service module 420 reads information contained in the PrivateRecordingSpec and generates the RecordingRequest object (S820). The RecordingRequest object is an object including detailed information about recording, which is used upon reproduction after recording is finished. The PrivateRecordingSpec is extended from RecordingSpec of GEM including information, such as the channel information, the start time, and the end time, of a single recording and has an extensible structure in which an application manufacturer can additionally specify necessary data. The application 401 may make a request for Series Recording, such as recording of an entire drama series as well as the single recording using the PrivateRecordingSpec, to the interface module 410.

The service module 420 determines whether the generated RecordingRequest object is a ParentRecordingRequest object (S830). If the generated RecordingRequest object is the ParentRecordingRequest object, the service module 420 calls OcapRecordingManager.resolve( )API and generates several LeafRecordingRequests having information about an actual individual recording (S840). The ParentRecordingRequest has imaginary information about entire Series Recording, which is delivered to a RequestResolutionHandler registered by the application 401 when OcapRecordingManager.resolve( )API is called.

The service module 420 inserts the generated RecordingRequest object including the ParentRecordingRequest and LeafRecordingRequest into a list called a RecordingList (S850). That is, the service module 420 inserts the RecordingRequest objects of the completed recording and all the requests for the recording into the list called the RecordingList, and manages the RecordingRequest objects.

The service module 420 determines whether a recording start time specified in a RecordingSpec is reached (S860). If the recording start time is reached, the service module 420 makes a request for recording (S870). The service module 420 changes the state of the RecordingRequest (S880).

Figure 9:
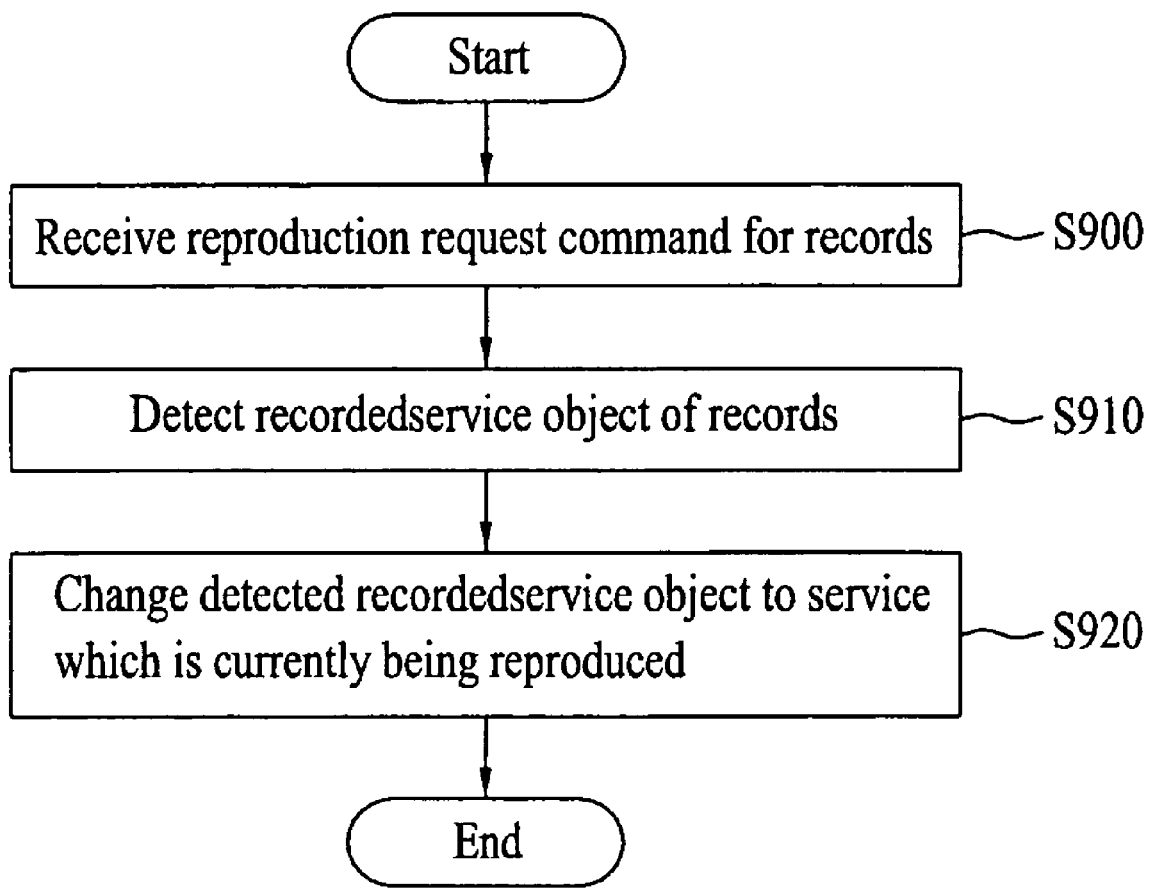
FIG. 9 is a flowchart illustrating a reproducing process performed on a middleware according to an exemplary embodiment of the present invention.

FIG. 9 is a flowchart illustrating a reproducing process performed on a middleware according to an exemplary embodiment of the present invention.

Referring to FIG. 9, the interface module 410 receives the calling of the LeafRecordedRequest.getService( ) API by a reproduction request command for the records from the application 401 (S900). When the user selects a specific record from a reproduction list displayed by the application 401, the LeafRecordedRequest.getService( ) API for the records associated with the selected specific record may be called. The reproduction list may be a list of records calculated by the middleware 400 by the record list request command.

The service module 420 detects a RecordedService object of the stored records via a corresponding RecordingRequest (S910). The service module 420 changes the detected Recordedservice object to a service which is currently being reproduced (S920).

This service is defined as a concept used in a data broadcast and is similar to an analog broadcast channel. As the service, video, audio, data, and service information necessary for reproducing them are transmitted together. The broadcast receiver 300 selects one of several services transmitted with stream frequencies and outputs a broadcast provided by the selected service. In order to process the broadcast recorded in the storage medium 402 via the DVR API by the same scheme, in the OCAP standard, the service called a RecordedService is supported by a Java interface extended with respect to the recorded broadcast. When the cable broadcast receiver 300 selects and reproduces the RecordedService of the recorded broadcast instead of the service which is currently being transmitted by streams, the recorded broadcast is output.

Figure 10:
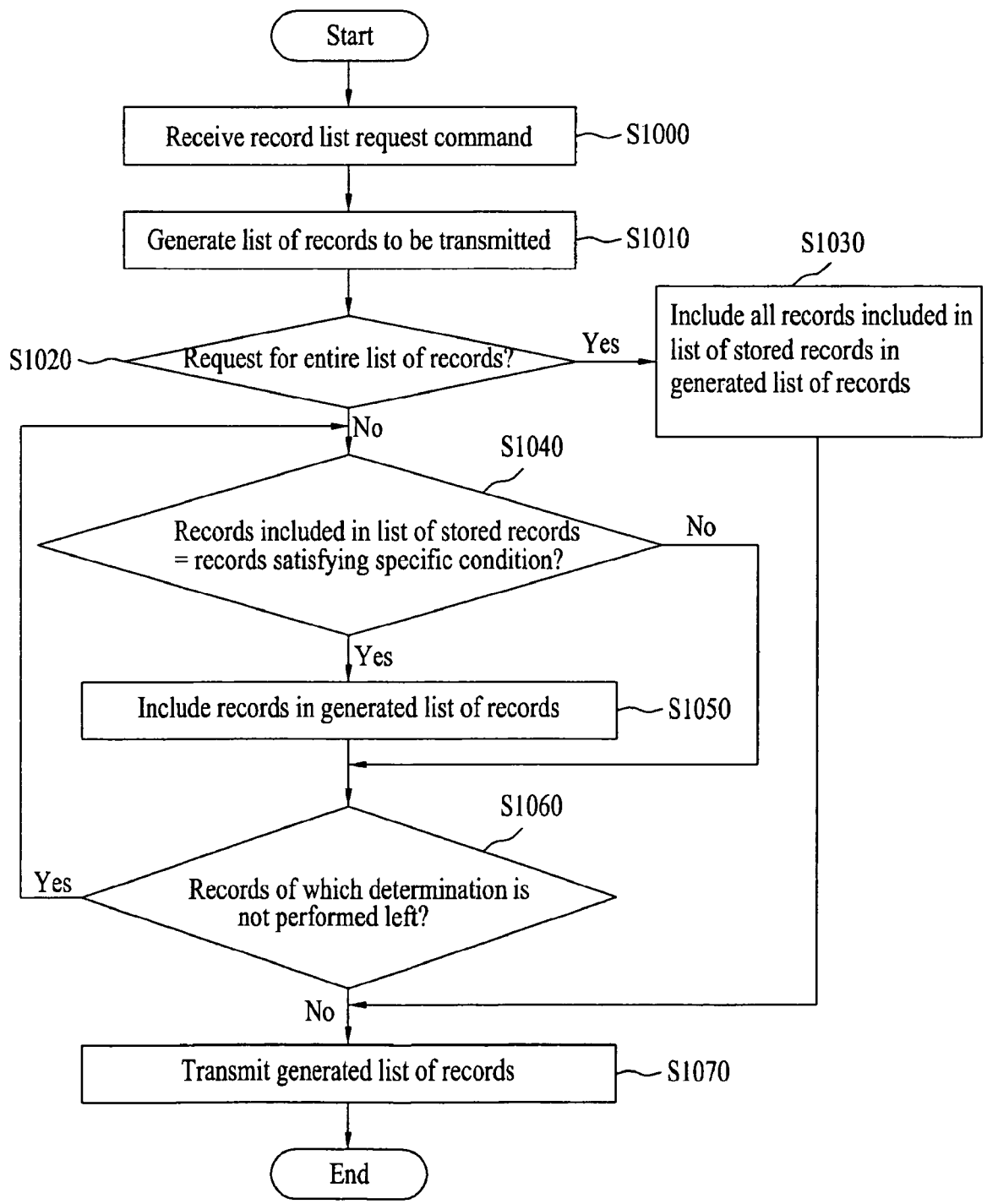
FIG. 10 is a flowchart illustrating a method for providing a list of records according to an exemplary embodiment of the present invention.

FIG. 10 is a flowchart illustrating a method for providing a list of records according to an exemplary embodiment of the present invention.

Referring to FIG. 10, the interface module 410 receives a request for a list of records from the application 401 (S1000). The service module 420 newly generates a list of records which will be transmitted to the application 401 (S1010). Then, the service module 420 checks whether the request is a request for an entire list of records (S1020).

If the request is the request for the entire list of records, then the service module 420 includes all records included in the list of stored records in the newly generated list of records (S1030).

If the request is not the request for the entire list of records, the service module 420 checks whether the records belonging to the list of stored records are the records satisfying the specific condition requested by the application 401 (S1040). The service module 420 may determine whether the records included in the list of stored records are the requested records based on the link between the objects of the records included in the list of stored records and the objects of the requested records. The service module 420 may determine whether the records included in the list of stored records are the requested records based on the link between the records.

If the records included in the list of stored records are the requested records, that is, the records satisfying the specific condition, the service module 420 includes the records in the generated list of records (S1050).

The service module 420 checks whether the determination is performed with respect to all the records included in the list of stored records (S1060).

If the determination is performed with respect to all the records included in the list of stored records, then the interface module 410 transmits the detected list of record series to the data broadcast-associated application 110 (S1070).

Figure 11:
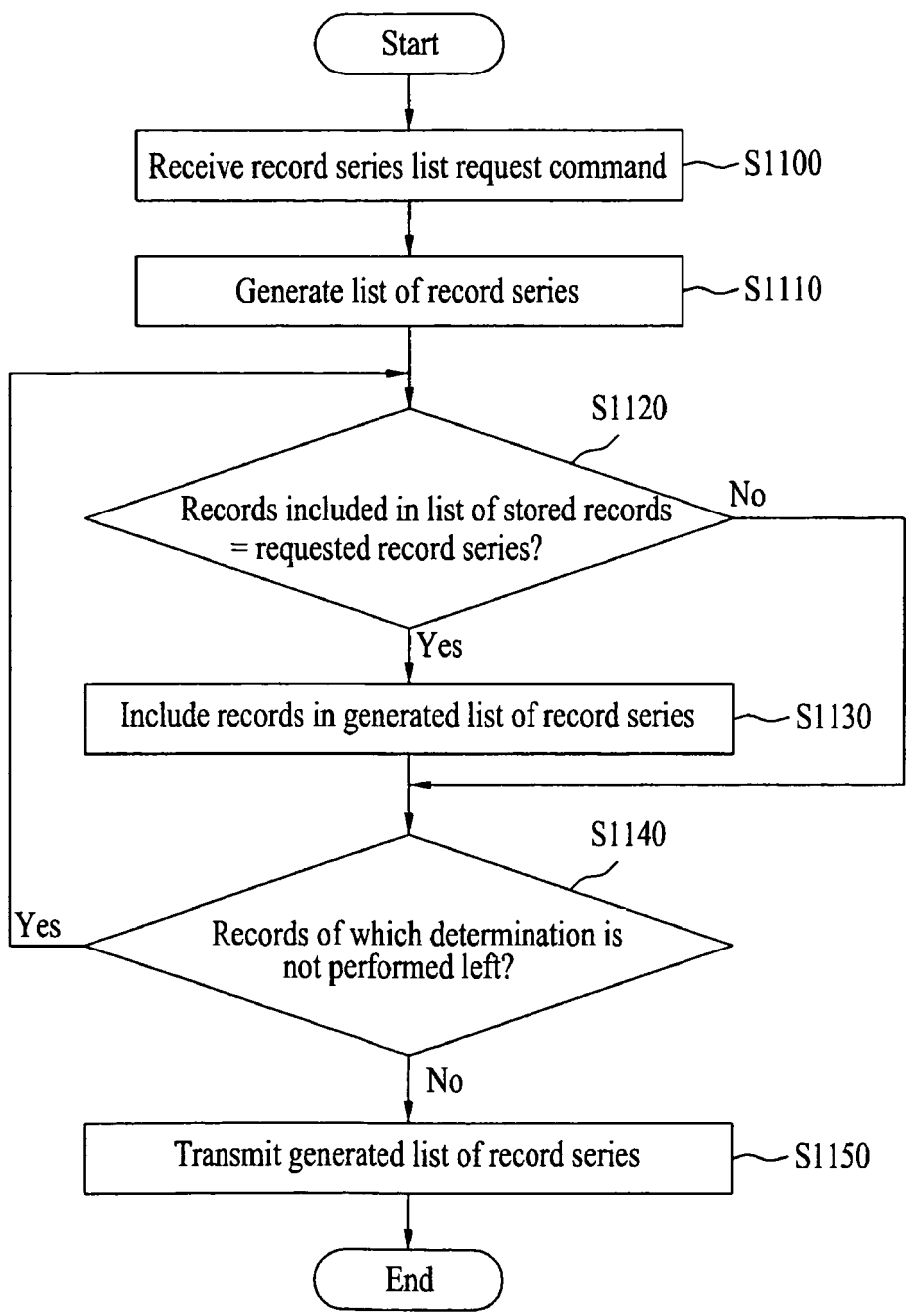
FIG. 11 is a flowchart illustrating a method for providing a list of records according to another exemplary embodiment of the present invention.

FIG. 11 is a flowchart illustrating a method for providing a list of records according to another exemplary embodiment of the present invention.

Referring to FIG. 11, the interface module 410 receives a record series list request command from the application 401 (S100).

The service module 420 generates a list of record series (S1110). The service module 420 determines whether the records included in the list of stored records are the record series requested by the application 401 (S1120). The service module 420 may determine whether the records included in the list of stored records are the record series based on the list between the objects of the record series requested by the application 402 and the objects of the records included in the list of stored records. The service module 420 may determine whether the records included in the list of stored records are the record series based on the link between the record series.

If the records are the record series, then the service module 420 includes the records in the list of record series (S1130).

The service module 420 checks whether the determination is performed with respect to all the records included in the list of stored records (S1140).

If the determination is performed with respect to all the records included in the list of stored records, the service module 420 transmits the detected list of record series to the data broadcast-associated application 110 (S1150).

Figure 12:
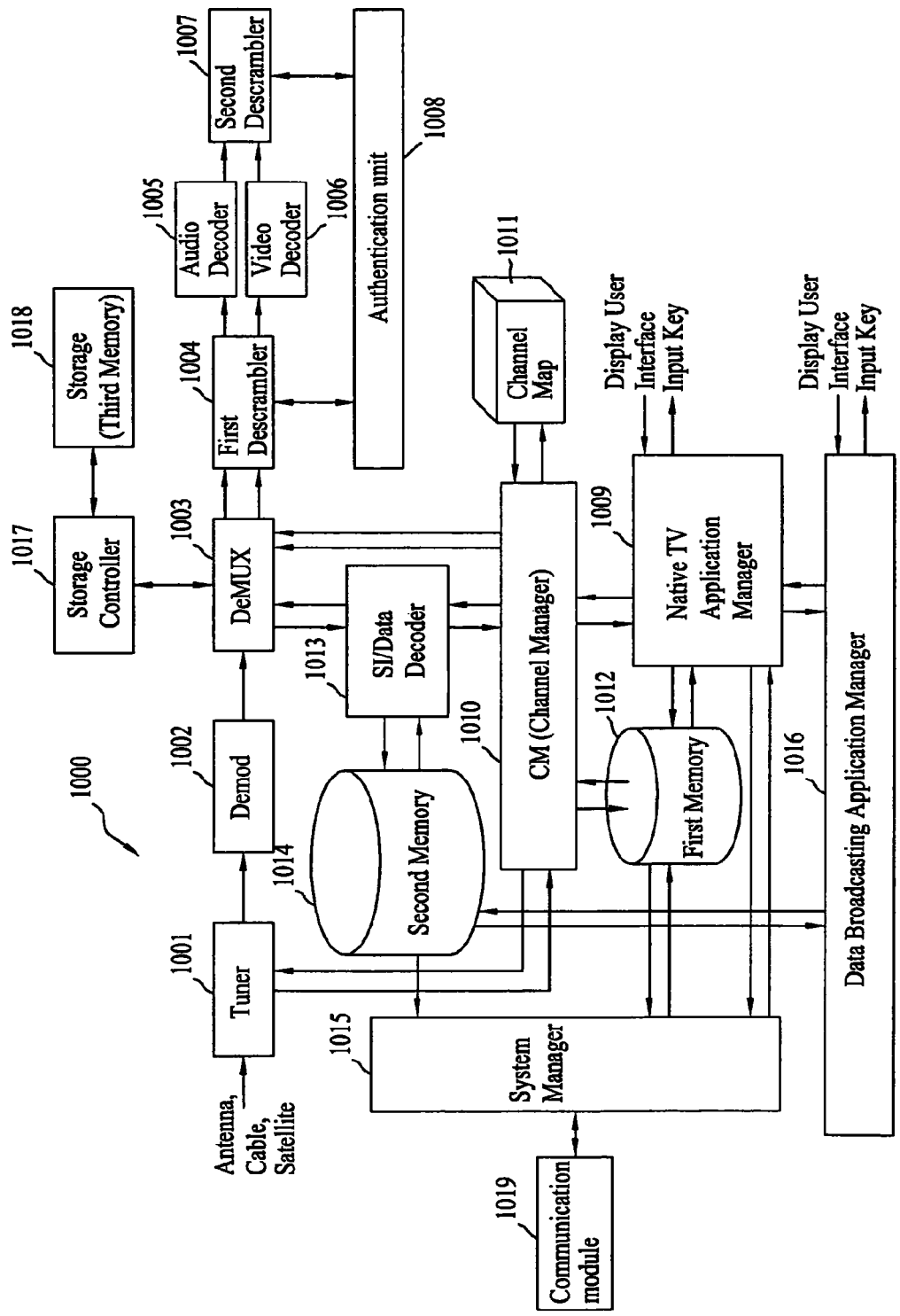
FIG. 12 is a block diagram showing the configuration of a broadcast receiver according to another exemplary embodiment of the present invention.

FIG. 12 is a block diagram showing the configuration of a broadcast receiver according to another exemplary embodiment of the present invention.

Referring to FIG. 12, the broadcast receiver 1000 according to the present invention may include a tuner 1001, a demodulating unit 1002, a demultiplexer 1003, a first descrambler 1004, an audio decoder 1005, a video decoder 1006, a second descrambler 1007, an authentication unit 1008, a native TV application manager 1009, a channel manager 1010, a channel map 1011, a first memory 1012, an SI and/or data decoder 1013, a second memory 1014, a system manager 1015, a data broadcasting application manager 1016, a storage controller 1017, a third memory 1018, and a communication module 1019. The first memory 1012 is a non-volatile memory (NVRAM) (or a flash memory). The third memory 1018 is a mass storage device such as a hard disc drive (HDD) or a memory chip. The same components of FIG. 12 as the components of FIG. 3 refer to the contents of FIG. 3 and the description thereof will be omitted herein. The native TV application manager 1009 is a component corresponding to the native application 130, the system manager 1015 and the data broadcasting application manager 1016 are components corresponding to the monitor application 116, and the channel manager 1010 and the storage controller 1017 are components corresponding to the middleware 120. The third memory 1018 is a component corresponding to the hard disc 151.

A transmitter may scramble broadcasting contents and transmit the scrambled broadcasting contents, in order to provide a service for preventing a service and/or main data transmitted over a broadcasting network from being illegally copied or viewed or a pay broadcasting service.

In this case, the broadcast receiver 1000 according to the present invention can provide the broadcasting contents to the user by descrambling the scrambled broadcasting contents. In addition, the broadcast receiver 1000 according to the present invention may perform an authentication process using the authentication unit before descrambling.

Hereinafter, the broadcast receiver including the authentication unit and the descrambler according to the embodiment of the present invention will be described.

The broadcast receiver 1000 according to the present invention may include the descrambler for receiving and descrambling the scrambled broadcasting contents and the authentication unit for authenticating whether the broadcast receiver is an entitled broadcast receiver.

Hereinafter, for convenience of description, the descrambler is called the descramblers 1004 and 1007, and the authentication unit is called the authentication unit 1008. These are only exemplary and may be called other names. For example, the descrambler may be called a decryptor.

At this time, although the broadcast receiver 1000 internally includes the descramblers 1004 and 1007 and the authentication unit 1008 in the embodiment of the present invention, the descramblers and the authentication units may be separately included in an external module. The descramblers 1004 and 1007 and the authentication unit 1008 may be separately included in an internal or external module. The module includes a slot type module such as an SD or CF memory, a memory stick type module and a USB type module and may be attached to or detached from the broadcast receiver 1000.

As described above, in the broadcast receiver 1000, when authentication is successful by the authentication unit 1008, the scrambled broadcasting contents may be descrambled by the descramblers 1004 and 1007 and the descrambled broadcasting contents may be provided to the user. At this time, the authentication method and the descrambling method may use various methods. However, in this case, these methods should be previously set by the agreement between the transmitter and the receiver.

Hereinafter, for convenience of description, several embodiments of the authentication method and the descrambling method will be described and overlapped portions will be omitted. However, the present invention is not limited to the following several embodiments and includes the techniques known by those skilled in the art.

First, the case where the broadcast receiver 1000 includes the authentication unit 1008 and the descramblers 1004 and 1007 will be described.

The broadcast receiver 1000 receives the scrambled broadcasting contents via the tuner 1001 and the demodulating unit 1002, and the system manager 1015 determines whether or not the received broadcasting contents are scrambled. If it is determined that the broadcasting contents are scrambled, then the authentication unit 1008 is controlled to be operated.

As described above, the authentication unit 1008 performs the authentication process in order to determine whether or not the broadcast receiver is an entitled host capable of receiving a pay broadcasting service. At this time, the authentication process may be changed according to various authentication methods.

As one embodiment, the authentication unit 1008 may perform the authentication process by comparing the IP address of the IP datagram in the received broadcasting contents and the unique address of the host. At this time, the unique address of the broadcast receiver 1000 may be an MAC address. That is, the authentication unit 1008 extracts the IP address from the decapsulated IP datagram and obtains broadcast receiver information mapped to that address. At this time, the broadcast receiver 1000 should include information which can map the IP address and the broadcast receiver information (e.g., in the form of a table) in advance.

Therefore, the authentication unit 1008 performs the authentication process by determining whether or not the address of the broadcast receiver and the broadcast receiver information mapped to the IP address are identical. That is, the authentication unit 1008 may determine that the broadcast receiver is the entitled broadcast receiver if it is determined that the two pieces of information are identical.

As another embodiment, a method of defining standardized identification information at a transmitter and a receiver in advance, transmitting the identification information of the broadcast receiver which applies for a pay broadcasting service at the transmitter, and, at the broadcast receiver, determining whether the received identification information is identical to its identification information so as to perform the authentication process may be used. That is, the transmitter generates and stores the identification information (number) of the broadcast receiver which applies for the pay broadcasting service in a database, and transmits the identification information in a state of being included in one entitlement management message (EMM) when the broadcasting contents are scrambled.

When the broadcasting contents are scrambled, a message (e.g., entitlement control message (ECM) or EMM) such as conditional access system (CAS) information, mode information, message location information applied to the scrambling is transmitted via a corresponding data header or other packets. The ECM may include a control word (CW) used for scrambling. At this time, the CW may be encrypted by an authentication key. The EMM may include the authentication key and entitlement information of the data. The authentication key may be encrypted by a unique distribution key of the receiver. That is, it is assumed that the service data is scrambled using the CW and information for authentication and information for descrambling are transmitted from the transmitter. Then, the transmitter encrypts the CW by the authentication key, includes the encrypted CW in the ECM, and transmits the ECM. The transmitter includes the authentication key used for encrypting the CW and the entitlement of the broadcast receiver (e.g., a standardized serial number of the entitled broadcast receiver) in the EMM, and transmits the EMM.

Accordingly, the authentication unit 1008 of the broadcast receiver extracts the identification information of the broadcast receiver, extracts the identification information included in the received EMM of the broadcast service, determines whether or not the two pieces of identification information are identical, and performs the authentication process. That is, if it is determined that the two pieces of information are identical, then the authentication unit 1008 determines that the broadcast receiver is the entitled broadcast receiver.

As another embodiment, the broadcast receiver may include the authentication unit 1008 in the detachable external module. At this time, the broadcast receiver 1000 and the external module are interfaced with each other via a common interface (CI). That is, the external module may receive the scrambled data from the broadcast receiver 1000 via the CI, and perform descrambling or transmit only information necessary for descrambling to the broadcast receiver 1000.

The CI includes a physical layer and one or more protocol layers. The protocol layer may have a structure including one or more layers for providing independent functions in consideration of future extensibility.

The external module may be a memory or card which can store the key information used for scrambling and authentication information without a descrambling function, or a card with a descrambling function. That is, the module may include the descrambling function in hardware, middleware or software.

At this time, both the broadcast receiver 1000 and the external module should be authenticated in order to provide the pay broadcasting service provided by the transmitter to the user. Accordingly, the transmitter may provide the pay broadcasting service to the authenticated broadcast receiver and module.

The broadcast receiver 1000 and the external module need to perform mutual authentication via the CI. That is, the module may communicate with the system manager 1015 in the broadcast receiver via the CI and authenticate the broadcast receiver, and the broadcast receiver 1000 may authenticate the module via the CI. The module may extract and transmit the ID of the broadcast receiver and its ID to the transmitter in the mutual authentication process, and the transmitter may use the received IDs as information indicating whether or not the service will be started or charging information. The system manager 1015 may transmit the charging information to the remote transmitter via the communication unit 1019, if necessary.

The authentication unit 1008 authenticates the broadcast receiver and/or the external module, and determines that the broadcast receiver is the entitled broadcast receiver capable of receiving the pay broadcasting service if the authentication is successful. In addition, the authentication unit 1008 may not receive authentication-associated data from the transmitter for providing the broadcasting contents, but may receive the authentication-associated data from a mobile operator to which the user of the broadcast receiver subscribes. At this time, the authentication-associated data may be scrambled by the transmitter for providing the broadcasting contents and be transmitted via the mobile operator or may be scrambled and transmitted by the mobile operator.

If the authentication unit 1008 performs the authentication process and the authentication is successful, the broadcast receiver 1000 may descramble the scrambled broadcasting contents. At this time, the descrambling is performed by the descramblers 1004 and 1007, and the descramblers 1004 and 1007 may be included in the internal or external module of the broadcast receiver.

Alternatively, the broadcast receiver 1000 may include the CI and communicate with the external module including the descramblers 1004 and 1007 to perform descrambling. That is, the descramblers 1004 and 1007 may be included in the module or the broadcast receiver in the form of hardware, middleware or software, and may be included in both or any one of the module and the broadcast receiver.

If the descramblers 1004 and 1007 are included in the broadcast receiver, it is advantageous that the transmitter (including at least one of a service provider and a broadcasting station) scrambles data by the same scrambling method and transmits the scrambled data.

If the descramblers 1004 and 1007 are included in the external module, it is advantageous that the data is scrambled by different scrambling methods according to the transmitters and the scrambled data is transmitted. In this case, since the broadcast receiver may not include the descrambling algorithms of the transmitters, it is possible to simplify and downsize the broadcast receiver. Accordingly, in this case, the external module may become a main body for providing functions for various services to be provided to the user and a CA function exclusively provided by each of the transmitters.

The CI performs communication between various types of external modules and the system manager 1015 in the broadcast receiver by a single mode. In addition, since the broadcast receiver 1000 are simultaneously connected to one or more modules for providing different services and are operated, the broadcast receiver has a structure in which a plurality of modules and the system manager 1015 are connected to each other.

A CI protocol between the broadcast receiver 1000 and the external module includes a function for periodically checking the state of a counterpart in order to maintain normal communication. The broadcast receiver 1000 and the module include a function for managing the state of the counterpart using such a function, reporting malfunction to the user or the transmitter when the malfunction occurs in any one of the broadcast receiver and the module, and recovering the malfunction.

As another embodiment, the authentication process may be performed in software, instead of in hardware.

That is, when a memory card in which CAS software is previously stored by downloading is inserted, the broadcast receiver 1000 receives and loads the CAS software from the memory card, and performs the authentication process. In one embodiment of the present invention, the CAS software read from the memory card is installed in the first memory 1012 of the broadcast receiver 1000 and is driven as one application. In particular, in one embodiment of the present invention, the CAS software is installed based on the middleware and is executed. In addition, a Java middleware is used as the middleware.

The broadcast receiver 1000 may include the CI, for connection to the memory card. The first memory 1012 may include a volatile memory, a non-volatile memory and a flash memory (or a flash ROM). At this time, the memory card mainly uses a flash memory or a small-sized hard disc. The memory card may be used by at least one broadcast receiver 1000 according to the contents, authentication, scrambling, and charging method of the stored CAS software.

However, the CAS software should include at least information necessary for authentication and information necessary for descrambling.

Accordingly, the authentication unit 1008 performs the authentication process between the transmitter and the broadcast receiver 1000 and between the broadcast receiver 1000 and the memory card. At this time, similar to the above description, the memory card is entitled to reception, and may include information about the authenticable normal broadcast receiver 1000. For example, the information about the broadcast receiver 1000 may include identification information such as a serial number standardized with respect to the broadcast receiver. Accordingly, the authentication unit 1008 may perform the authentication process between the memory card and the broadcast receiver 1000 by comparing the identification information such as the standardized serial number included in the memory card with the identification information of the broadcast receiver.

When the CAS software is operated based on the Java middleware, first, the authentication process between the broadcast receiver 1000 and the memory card is performed. For example, it is checked whether or not the identifier of the broadcast receiver 1000 included in the CAS software and the identifier of the broadcast receiver 1000 read from the system manager 1015 of the broadcast receiver 1000 are identical and, if the identifiers are identical, it is checked that the memory card is the normal memory card which is available in the broadcast receiver 1000. At this time, the CAS software may be installed in the first memory 1012 before shipment of the broadcast receiver 1000 or may be downloaded from the transmitter, the module or the memory card to the first memory 1012. Then, the descrambling function may be operated as one application by the data broadcasting application manager 1016.

Thereafter, the CAS software parses EMM/ECM packets output from the demultiplexer 1003, checks whether or not the receiver is entitled to reception, and obtains and provides information (that is, the CW) necessary for descrambling to the descramblers 1004 and 1007. That is, the CAS software operated based on the Java middleware reads the identifier of the broadcast receiver from the broadcast receiver 1000, compares the read identifier with the identifier of the broadcast receiver 1000 transmitted by the EMM, and checks whether or not the broadcast receiver 1000 is entitled to reception.

If it is checked that the broadcast receiver 1000 is entitled to reception, then it is checked whether or not the broadcast receiver 1000 is entitled to reception of the broadcasting service, using the broadcasting service information transmitted by the ECM and the entitlement of the broadcasting service. If it is checked that the broadcast receiver is entitled to the reception of the broadcasting service, the encrypted CW transmitted by the ECM is decrypted using the authentication key transmitted by the EMM and the decrypted CW is output to the descramblers 1004 and 1007. The descramblers 1004 and 1007 descramble the broadcasting service using the CW.

The CAS software stored in the memory card is extensible according to a pay service provided by the broadcasting station. The CAS software may include other supplementary information as well as information associated with the authentication and descrambling.

The broadcast receiver 1000 may download the CAS software from the transmitter and upgrade the CAS software stored in the memory card.

In the present invention, if only the external memory interface is provided regardless of the type of the broadcast receiver, the CAS system is implemented in a manner of satisfying all memory cards which are detachably provided to the broadcast receiver 1000, such that a maximum function is implemented in the broadcast receiver 1000 capable of receiving the pay broadcasting contents such as broadcasts with minimum cost, and various types of broadcast receivers 1000 may be used.

In an implementation mode, since only a minimum API is implemented, a burden of a manufacturer of the broadcast receiver 1000 is minimized and a portion depending on the CAS manufacturer can be eliminated. Accordingly, cost consumed for establishing the CAS device of the transmitter and the operating system can be minimized.

The descramblers 1004 and 1007 may be included in the module in the form of in software or hardware. In this case, the received scrambled data may be descrambled and decoded by the module.

If the received scrambled data is stored in the third memory 1018, the scrambled data may be descrambled and stored or the scrambled data may be stored without conversion and be descrambled upon reproduction. If the scrambling/descrambling algorithm is included in the storage controller 1017, the storage controller 1017 may scramble the received scrambled data again and may store the scrambled data in the third memory 1018.

As another embodiment, the descrambled (conditional access) broadcasting contents are transmitted over a broadcasting network, and information associated with the authentication and descrambling, for removing the conditional access, is transmitted or received via the communication module 1019 such that bidirectional communication is possible in the broadcast receiver 1000.

The broadcast receiver 1000 delivers or receives the ID such as the MAC address or the serial number of the broadcast receiver to or from the communication module of the transmitter such that the transmitter recognizes the broadcasting contents which are transmitted to or received from the remote transmitter or the broadcast receiver 1000 for transmitting the broadcasting contents.

The communication module 1019 of the broadcast receiver 1000 provides a protocol necessary for performing the bidirectional communication with the communication module of the transmitter in the broadcast receiver 1000 which does not support the bidirectional communication function.

The broadcast receiver 1000 configures a protocol data unit (PDU) using a tag-length-value (TLV) coding method including data to be transmitted and an ID. A tag field includes indexing of the PDU, a length field includes the length of a value field, and the value field includes actual data to be transmitted and the ID of the broadcast receiver 1000.

If the broadcast receiver 1000 installs a Java platform and operates the platform after downloading a Java application of the transmitter to the broadcast receiver 1000 over a network, a structure for downloading the PDU including a tag field, which is arbitrarily defined by the transmitter, to the storage medium of the broadcast receiver 1000 and transmitting the PDU to the communication module 1019 is also possible.

In this case, the PDU may be configured in the Java application of the broadcast receiver 1000 and be output to the communication module 1019. Alternatively, the Java application may transmit a tag value, actual data to be transmitted and the ID of the broadcast receiver, and the PDU may be configured in the broadcast receiver 1000 by the TLV coding method.

Such a structure has an advantage that, although data (or an application) desired by the transmitter is added, the firmware of the broadcast receiver 1000 does not need to be changed.

At this time, the communication module of the transmitter transmits the PDU received from the broadcast receiver 1000 over a wireless data network or configures data received over the network to a PDU and transmits the PDU to the broadcast receiver 1000. At this time, the communication module of the transmitter may include the ID (e.g., an IP address or the like) of the remote transmitter when the PDU to be transmitted to the broadcast receiver 1000 is configured.

At this time, the broadcast receiver 1000 may include the CI and include a wireless local area network (LAN), a portable Internet, Wibro, WiMAX or the like which can be connected via a WAP, a CDMA 1×EV-DO, and an access point accessed by a mobile communication base station such as CDMA, GSM or the like, in the transmission or reception using the wireless data network. The above-described broadcast receiver 1000 does not have a communication function. In the broadcast receiver 1000 having the communication function, the communication function 1019 is unnecessary.

The broadcasting contents transmitted or received over the wireless data network may include data necessary for performing the CA function.

The demultiplexer 1003 receives real-time contents output from the demodulating unit 1002 or reproduction contents read from the third memory 1018 and performs demultiplexing.

The first descrambler 1004 receives the demultiplexed signal from the demultiplexer 1003 and descrambles the demultiplexed signal. At this time, the first descrambler 1004 may receive data necessary for descrambling and the authenticated result from the authentication unit 1008 and use them for descrambling.

The audio decoder 1005 and the video decoder 1006 receive the descrambled signal from the first descrambler 1004, decode the descrambled signal and output the decoded signal, or decode a signal, which is output without being descrambled by the first descrambler 1004, and output the decoded signal. In this case, the second descrambler 1007 descrambles the decoded signal.

Figure 13:
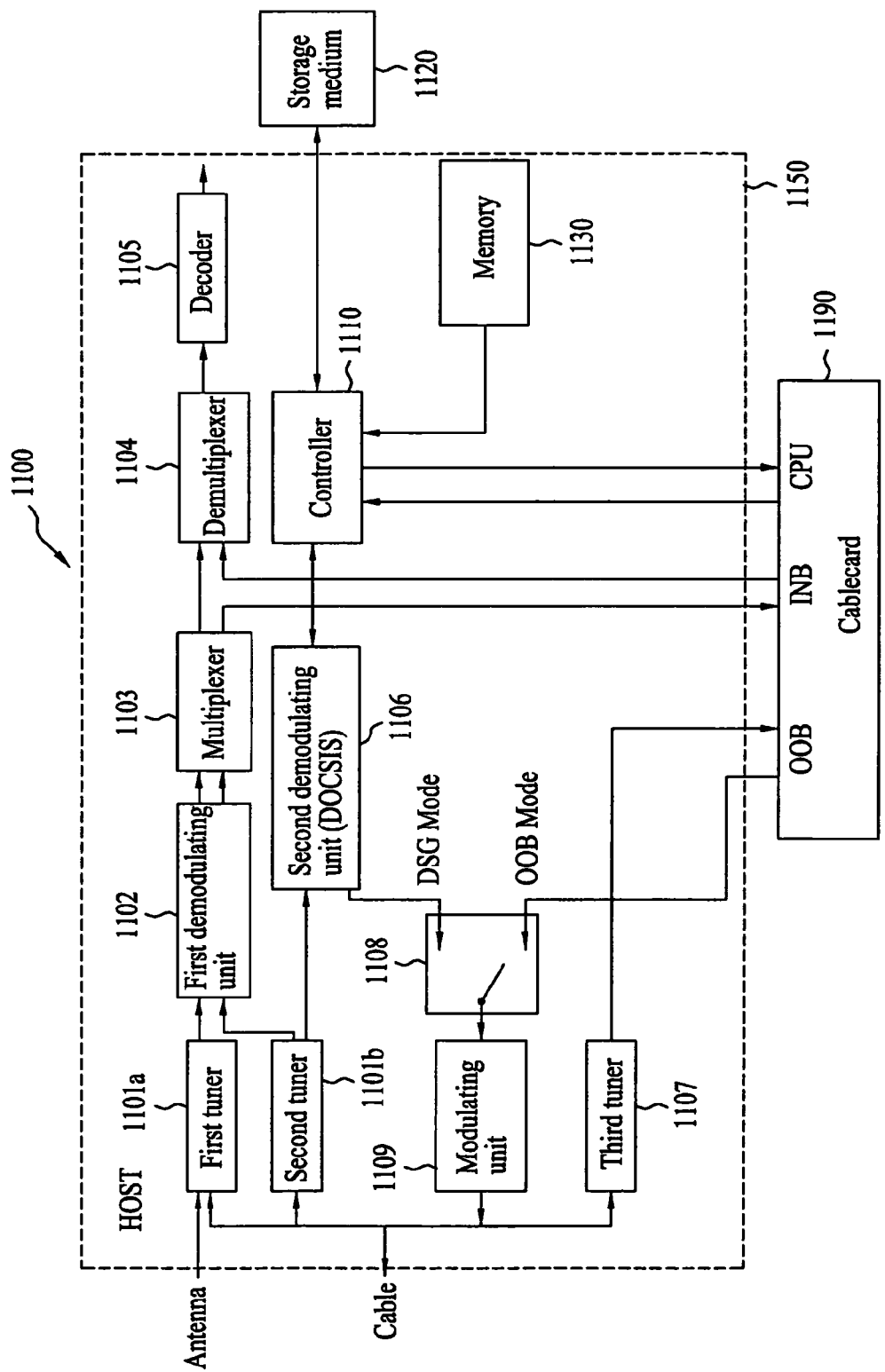
FIG. 13 is a block diagram showing the configuration of a broadcast receiver according to another exemplary embodiment of the present invention.

FIG. 13 is a block diagram showing the configuration of a broadcast receiver according to another exemplary embodiment of the present invention.

Referring to FIG. 13, a cable broadcast receiver 1100 includes a host 1150 and a cablecard 1190. The cablecard 1190 may be attached to or detached from the host 1150 and is one of a single (S) card which can process a single stream or a multi (M) card which can process multi streams.

The host 1150 may receive only a cable broadcast or receive at least one of a cable broadcast, a terrestrial broadcast or a satellite broadcast. The host 1150 includes a first tuner 1101*a*, a second tuner 1101*b*, a first demodulating unit 1102, a multiplexer 1103, a demultiplexer 1104, a decoder 1105, a second demodulating unit (data-over-cable service interface specifications (DOCSIS)) 1106, a third tuner 1107, a switching unit 1108, a modulating unit 1109, a controller 1110, an OCAP memory controller 1120, and a memory 1130.

A bidirectional communication mode between a cable broadcast receiver 1100 and a headend includes two modes: an out of band (OOB) mode and a DOCSIS settop gateway (DSG) mode. Accordingly, a viewer may select and view a desired program via the host 1150 using any one of the two modes. Alternatively, the viewer may directly participate in a broadcasting program and select and view necessary information. A data broadcasting service may be provided via the OOB mode and/or the DSG mode.

The first tuner 1101*a* tunes into only a specific channel frequency of a cable audio/video (A/V) broadcast signal transmitted in-band via a cable or a terrestrial A/V broadcast signal transmitted via an antenna, and outputs the tuned signal to the first modulating unit 1102.

The terrestrial broadcast and the cable broadcast signal are different from each other in a transport mode. The first demodulating unit 1102 can perform different demodulating methods with respect to the signals which are different in the transport mode. For example, the terrestrial A/V broadcast which is transmitted in a state of being modulated by a Vestigial Sideband Modulation (VSB) scheme is demodulated in a manner inverse to the VSB method. The cable A/V broadcast which is transmitted in a state of being modulated by a Quadrature Amplitude Modulation (QAM) scheme is demodulated in a manner inverse to the QAM scheme.

The signal demodulated by the first demodulating unit 1102 is output and is multiplexed by the multiplexer 1103 such that streams are output. At this time, if a plurality of in-band tuners for receiving the cable A/V broadcast is included and different channels are simultaneously tuned by the in-band tuners and are demodulated by respective demodulating units such that multi streams are output, the multi streams are multiplexed by the multiplexer 1103 to output the multiplexed signal.

If the signal demodulated by the first demodulating unit 1102 is the streams of the terrestrial broadcast, the demodulated streams are output to the demultiplexer 1104 via the multiplexer 1103. In contrast, if the signal demodulated by the first demodulating unit 1102 is the streams of the cable broadcast, the demodulated streams are output to the demultiplexer 1104 via the multiplexer 1103 and the cablecard 1190 mounted in a slot. The cablecard 1190 includes a conditional access (CA) system for preventing illegal copy of higher value-added broadcasting contents and restricting access to the contents, which is also called a Point Of Deployment (POD).

If the single stream or the multi streams of the cable broadcast output from the multiplexer 1103 is scrambled, the cablecard 1190 descrambles the single stream or the multi streams and outputs the descrambled streams to the demultiplexer 1104. If the cablecard 1190 is not mounted, the signal streams or the multi streams of the cable broadcast demodulated by the first demodulating unit 1102 is directly output to the demultiplexer 1104. In this case, since the scrambled cable signal is not descrambled, the signal is not normally displayed on the screen.

The demultiplexer 1104 demultiplexes the received broadcasting streams into audio, video, and data streams, and outputs the streams to the demodulator 1105. The decoder 1105 may include an audio decoder, a video decoder, and a data decoder. That is, the audio streams demultiplexed by the demultiplexer 1104 are decoded by the audio decoder, the video streams are decoded by the video decoder, and the data streams are decoded by the data decoder.

The second tuner 1101*b* tunes into a specific channel frequency of the data broadcast transmitted via the cable in the DSG mode, and outputs the tuned signal to the second demodulating unit 1106. The second demodulating unit 1106 demodulates the data broadcast of the DSG mode and outputs the demodulated broadcast signal to the controller 1110.

The third tuner 1107 tunes into a specific channel frequency of a downlink data broadcast transmitted via the cable in the OOB mode, and outputs the tuned signal to the cablecard 1190.

If bidirectional communication between the headend and the broadcast receiver 1100 is possible, uplink information (e.g. pay program application, diagnostic information of the host, or the like) transmitted from the broadcast receiver 1100 to the headend may be transmitted in the OOB mode or the DSG mode. Accordingly, the embodiment of the broadcast receiver according to the present invention may include the switching unit 1108 so as to select any one of the OOB mode and the DSG mode and transmit the information.

In the OOB mode, user information or system diagnostic information is output to the modulating unit 1109 via the cablecard 1190 and the switching unit 1108, and the modulating unit 1109 modulates the signal output from the switching unit 1108 using a Quadrature Phase Shift Keying (QPSK) modulation scheme and transmits the modulated signal to the headend via the cable. If the broadcasting information of the user is transmitted in the DSG mode, the broadcasting information of the user is output to the modulating unit 1109 via the controller 1110 and the switching unit 1108, and is transmitted to the headend via the cable after being modulated by the modulating unit 1109 using a QAM-16 modulation scheme.

The controller 1110 may perform a DVR function using the storage medium 1120 as a storage unit. That is, the controller 1110 may perform a personal video recorder (PVR) based on the storage medium 1120 and store records in the storage medium 1120. The controller 1110 may set a "time-shift buffer" in the storage medium 1120 in order to perform a time shift function. The storage medium 1120 may be provided inside the cable broadcast receiver 1100, or may be an external storage medium 1120 connected via a USB port or the like, or may be a storage medium which is provided inside or outside an information communication device connected over a data network by an IEEE802.11 communication scheme, an IEEE802.11n communication scheme, an IEEE802.11g communication scheme, an IEEE802.15.4 communication scheme, a WiFi communication scheme, an Ethernet communication scheme, or a GRS communication scheme.

The operation of the controller 1110 may be performed in any one of hardware, firmware, middleware, or software or a combination of at least two thereof. A computer-readable code for executing the applications 110 and 130, the middleware 120 and the operating system 140 and other necessary data or information are stored in the memory 1130. The applications 110 and 130, the middleware 120 and the operating system 140 are executed when the power source of the cable broadcast receiver is turned on or according to the request of the user or another application.

Figure 14:
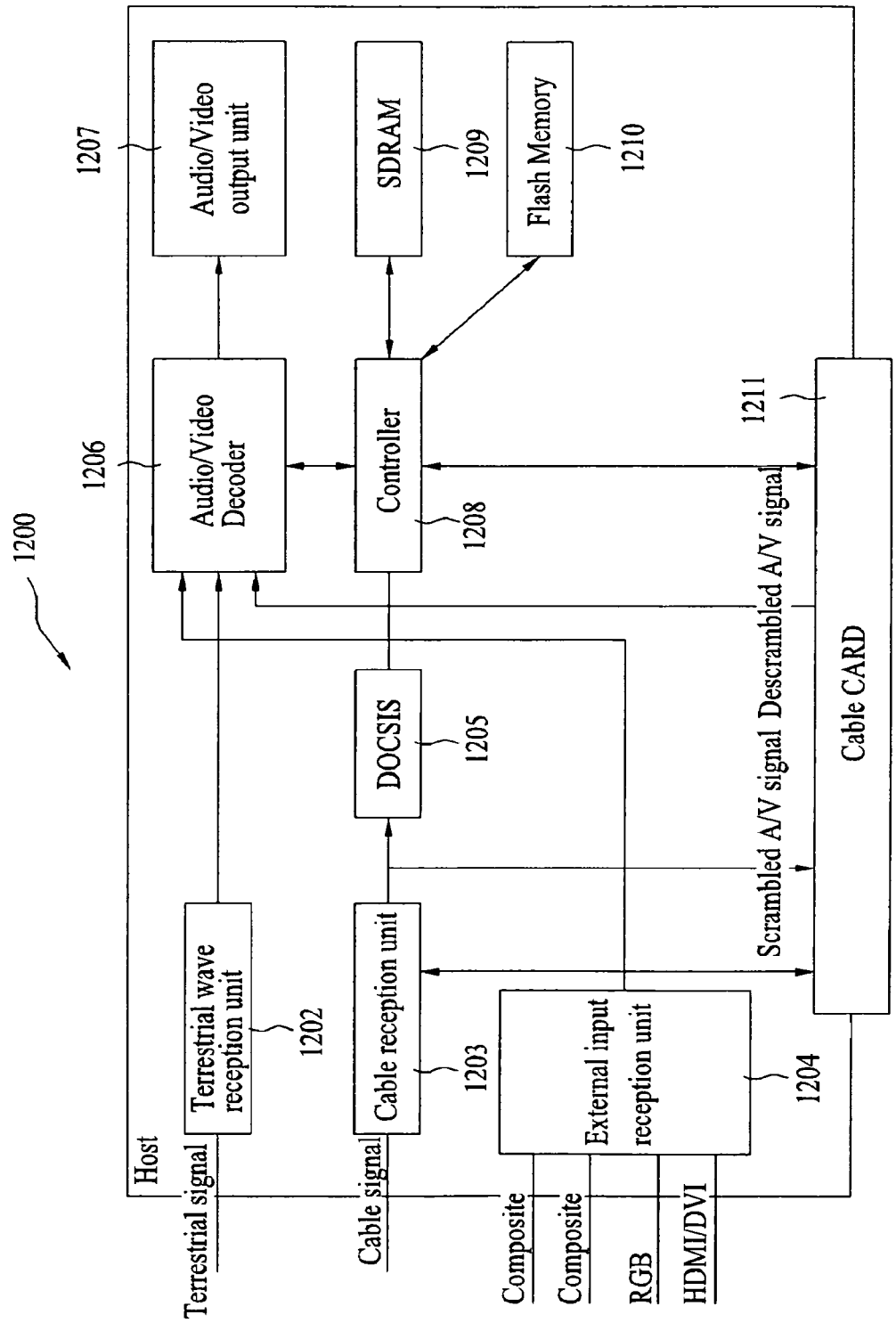
FIG. 14 is a block diagram showing the configuration of a broadcast receiver according to another exemplary embodiment of the present invention.

FIG. 14 is a block diagram showing the configuration of a broadcast receiver according to another exemplary embodiment of the present invention.

Referring to FIG. 14, the broadcast receiver 1200 according to the present invention includes a terrestrial wave reception unit 1202, a cable reception unit 1203, an external input reception unit 1204, a DOCSIS 1205, an A/V decoder 1206, an A/V output unit 1207, a controller 1208, an SDRAM 1209, a flash memory 1210, and a cablecard 1211.

The broadcast receiver 1200 may be, for example, a digital TV (DTV) receiver which can receive a cable broadcast or a bidirectional digital cable ready (iDCR) TV receiver.

The main role of the cablecard 1211 is to descramble a scrambled cable broadcast signal.

In order to support bidirectional communication, an in-band tuner which can receive a QAM signal and an OOB tuner which can receive a QPSK signal are mounted in the cable reception unit 1203. Since a DOCSIS modem can be separately mounted, bidirectional communication is supported using the OOB tuner and the DOCSIS modem by the selection of the MSO and the cablecard 1211.

The terrestrial wave reception unit 1202 receives, demodulates and converts a VSB signal into a digital signal and delivers the digital signal to the A/V decoder 1206. In the A/V decoder 1206, the video decoder may be an MPEG video decoder, and the audio decoder may be an AC3 audio decoder.

The cable reception unit 1203 includes two tuners, that is, an in-band tuner and an OOB tuner. In particular, the in-band tuner can receive only a QAM signal, and the OOB tuner can receive a QPSK or QAM signal.

The QAM signal received via the in-band tuner is a signal including audio data, video data or data broadcast information, the audio data and the video data may be scrambled or unscrambled. The QAM signal is delivered to the cablecard 1211 regardless of whether or not the signal is scrambled, and is descrambled, and the descrambled signal is delivered to the A/V decoder 1206.

The cablecard 1211, the controller 1208 and the cable headend perform bidirectional communication using the QAM/QPSK signal received via the OOB tuner and the DOCSIS modem.

The controller 1208 may be, for example, implemented by a microcomputer or a central processing unit (CPU).

A computer-readable code for executing the applications 110 and 130, the middleware 120 and the operating system 140 and other necessary data or information are stored in the flash memory 1210. The flash memory 1210 is only exemplary and another memory for storing data may be used.

When the power source of the broadcast receiver 1200 is turned on, the software stored in the flash memory 1210 is transferred to and executed by the SDRAM 1209, under the control of the controller 1208.

The broadcasting station transmits the data broadcast-associated application 110 via a data broadcast, and the transmitted data broadcast-associated application 110 is stored in and executed by the SDRAM 1209. The data broadcast-associated application 110 may be stored in the flash memory 1210 such that the same data broadcast-associated application 110 is prevented from being downloaded whenever the power source of the broadcast receiver 1200 is turned on.

The present invention can also be embodied as computer-readable codes on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for providing a list of records in a digital broadcast receiver, the method comprising:
receiving a list request for requesting a list of record series belonging to a series from a data broadcast-associated application;
generating a first list for including the record series in response to receiving the list request;
selecting a record from records included in a second list of stored records based on a link between the series and the record and including the selected record in the generated first list; and
transmitting the generated first list to the data broadcast-associated application,
wherein the selected record is determined by comparing an object of the record series included in the first list to an object of the record included in the second list of stored records, and extracting the corresponding record from the second list when the object of the record series of the first list and the object of the second list are the same,
wherein the object of the record series of the first list is a ParentRecordingRequest object, and the object of the record of the second list is a RecordingRequest object, the object of the record series and the object of the record have an inheritance relationship, if the ParentRecordingRequest object is the same as the RecordingRequest object, and the corresponding record is extracted from the second list, when the object of the record series and the object of the record have the inheritance relationship.

2. The method according to the claim 1, wherein the list of stored records is a list of programs which are stored by the digital broadcast receiver.

3. The method according to the claim 1, wherein the series is a set of programs which are broadcasted in series.

4. The method according to the claim 1, wherein the data broadcast-associated application calls a first application program interface (API) including information indicating the series and a second API including a return value of the called first API.

5. The method according to the claim 4, wherein the called second API selects the record from records included in the list of the stored records based on the return value and includes the selected record in the generated list.

6. The method according to the claim 4, wherein the information indicating the series is a ParentRecordingRequest object and the return value is an object of a class inheriting a RecordingListFilter class, the object of the returned value includes the ParentRecordingRequest object as an attribute value.

7. A digital broadcast receiver for providing a list of records, the digital broadcast receiver comprising:
 a reception unit configured to receive a broadcast signal including a data broadcast-associated application;
 a storage medium configured to store records; and
 a controller configured to manage the application, receive a list request for requesting a list of record series belonging to a series from the data broadcast-associated application, generate a first list in response to the list request, select a record from a second list of the stored records based on a link between the series and the record, include the selected record in the generated first list, and transmit the generated first list to the application,
 wherein the selected record is determined by comparing an object of the record series included in the first list to an object of the record included in the second list of stored records, and extracting the corresponding record from the second list when the object of the record series of the first list and the object of the record of the second list are the same,
 wherein the object of the record series of the first list is a ParentRecordingRequest object, and the object of the record of the second list is a RecordingRequest object, the object of the record series and the object of the record have an inheritance relationship, if the ParentRecordingRequest object is the same as the RecordingRequest object, and the corresponding record is extracted from the second list, when the object of the record series and the object of the record have the inheritance relationship.

8. The digital broadcast receiver according to the claim 7, wherein the data broadcast-associated application calls a first application program interface (API) including information indicating the series and a second API including a return value of the called first API.

* * * * *